(12) United States Patent
Tokgoz et al.

(10) Patent No.: US 8,666,411 B2
(45) Date of Patent: Mar. 4, 2014

(54) METHOD AND APPARATUS FOR WIRELESS COMMUNICATION

(75) Inventors: Yeliz Tokgoz, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 12/619,236

(22) Filed: Nov. 16, 2009

(65) Prior Publication Data

US 2010/0130210 A1 May 27, 2010

Related U.S. Application Data

(60) Provisional application No. 61/117,052, filed on Nov. 21, 2008.

(51) Int. Cl.
*H04W 4/00* (2009.01)

(52) U.S. Cl.
USPC ........ 455/435.2; 455/436; 455/438; 455/439; 455/524; 455/525

(58) Field of Classification Search
USPC ........ 455/435.2, 436, 438, 524, 525, 522, 69, 455/115.3, 134, 135
See application file for complete search history.

(56) References Cited

U.S. PATENT DOCUMENTS

| | | | |
|---|---|---|---|
| 6,195,552 B1 * | 2/2001 | Jeong et al. | 455/436 |
| 6,587,690 B1 | 7/2003 | Di et al. | |
| 2003/0003921 A1 | 1/2003 | Laakso | |
| 2006/0286996 A1 * | 12/2006 | Julian et al. | 455/522 |
| 2007/0030887 A1 * | 2/2007 | Hutchison et al. | 375/149 |
| 2007/0049273 A1 * | 3/2007 | Proctor et al. | 455/436 |
| 2007/0072563 A1 * | 3/2007 | Weaver | 455/115.1 |
| 2009/0154400 A1 | 6/2009 | Nobukiyo et al. | |

FOREIGN PATENT DOCUMENTS

| | | |
|---|---|---|
| GB | 2391755 | 2/2004 |
| JP | 11069411 A | 3/1999 |
| JP | 2000244392 A | 9/2000 |
| JP | 2006179965 A | 7/2006 |
| JP | 2006340400 A | 12/2006 |
| KR | 20080021787 A | 3/2008 |
| WO | WO9832302 A1 | 7/1998 |
| WO | 2005094009 A1 | 10/2005 |
| WO | WO2006138570 | 12/2006 |

OTHER PUBLICATIONS

International Search Report & Written Opinion—PCT/US2009/065585, International Search Authority—European Patent Office—Mar. 4, 2010.

Taiwan Search Report—TW098139602—TIPO—Jan. 15, 2013.

* cited by examiner

*Primary Examiner* — Kiet Doan
*Assistant Examiner* — Dung Lam

(57) ABSTRACT

Systems and methods for performing a handoff of an access terminal from a macro node to a femto node are disclosed. In one embodiment, a femto convergence server may select a target femto node based on, at least in part, signal strengths of the reverse links between femto nodes with a specific identifier and an access terminal, and the transmit pilot powers of the femto nodes.

62 Claims, 13 Drawing Sheets

METHOD AND APPARATUS FOR WIRELESS COMMUNICATION

CLAIM OF PRIORITY UNDER 35 U.S.C. §119

The present Application for Patent claims priority to U.S. Provisional Application No. 61/117,052 entitled "METHOD AND APPARATUS FOR ACTIVE CALL HAND-IN FROM A MACRO CELL TO A FEMTO CELL" filed Nov. 21, 2008, and assigned to the assignee hereof and hereby expressly incorporated by reference herein.

BACKGROUND

1. Field

The present application relates generally to wireless communication, and more specifically to systems and methods to enable handoffs from macro nodes to femto nodes during connected calls.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as home access points (HAPs), or, alternatively, Home Node B (HNB), femtocells or femto nodes. Typically, such miniature base stations are connected to the Internet and the mobile operator's network via a DSL router or a cable modem. Multiple femto nodes may be deployed by individual users in the coverage area of a traditional macro node. This type of deployment can complicate handing off a call from a macro node to a particular femto node. Adjusting the manner in which calls are handed off from macro nodes to femto nodes may be desirable.

SUMMARY

In one embodiment, a device operable in a wireless communication system is provided. The device comprises a receiver configured to receive from each of a plurality of communication nodes respective data indicative of a power level of a signal received by one of the plurality of communication nodes from a wireless communication device, and indicative of a transmit power of a pilot signal transmitted by the one of the plurality of communication nodes. The device further comprises a selection module configured to identify a target communication node from the plurality of communication nodes based on, at least in part, the power level of the signal received by and the power level of the pilot signal transmitted by the one of the plurality of communication nodes. The device further comprises a processor configured to cause the wireless communication device to establish a communication channel with the target communication node.

In another embodiment, a method of communication is provided. The method comprises receiving from each of a plurality of communication nodes respective data indicative of a power level of a signal received by one of the plurality of communication nodes from a wireless communication device, and indicative of a transmit power of a pilot signal transmitted by the one of the plurality of communication nodes. The method further comprises identifying a target communication node from the plurality of communication nodes based on, at least in part, the power level of the pilot signal received by and the power level of the pilot signal transmitted by the one of the plurality of communication nodes. The method further comprises causing the wireless communication device to establish a communication channel with the target communication node.

In yet another embodiment, a device operable in a wireless communication system is provided. The device comprises means for receiving from each of a plurality of communication nodes respective data indicative of a power level of a signal received by one of the plurality of communication nodes from a wireless communication device, and indicative of a transmit power of a pilot signal transmitted by the one of the plurality of communication nodes. The device further comprises means for identifying a target communication node from the plurality of communication nodes based on, at least in part, the power level of the pilot signal received by and the power level of the pilot signal transmitted by the one of the plurality of communication nodes. The device further comprises means for causing the wireless communication device to establish a communication channel with the target communication node.

In a further embodiment, a computer program product, comprising a computer-readable medium is provided. The computer-readable medium comprises code for causing a computer to receive from each of a plurality of communication nodes respective data indicative of a power level of a pilot signal received by one of the plurality of communication nodes from a wireless communication device, and indicative of a transmit power of a pilot signal transmitted by the one of the plurality of communication nodes. The computer-readable medium further comprises code for causing a computer to identify a target communication node from the plurality of communication nodes based on, at least in part, the power level of the signal received by and the power level of the pilot signal transmitted by the one of the plurality of communication nodes. The computer-readable medium further comprises code for causing a computer to cause the wireless communication device to establish a communication channel with the target communication node.

In one embodiment, a device operable in a wireless communication system is provided. The device comprises a transmitter configured to transmit a pilot signal to a wireless communication device. The device further comprises a measuring module configured to obtain a power level of a signal received from the wireless communication device and a transmit power of the pilot signal. The transmitter is further configured to transmit to a communication server, data indicative of the power level of the signal received from the wireless communication device, and indicative of the transmit power of the pilot signal.

In another embodiment, a method of communication is provided. The method comprises transmitting a pilot signal to a wireless communication device. The method further comprises obtaining data indicative of a power level of a signal received from the wireless communication device, and indicative of a transmit power of the pilot signal. The method further comprises transmitting the data indicative of a power level of a signal received from a wireless communication device, and indicative of a transmit power of the pilot signal to a communication server.

In yet another embodiment, a device operable in a wireless communication system is provided. The device comprises means for transmitting a pilot signal to a wireless communication device. The device further comprises means for obtaining a power level of a signal received from the wireless communication device and a transmit power of the pilot signal. The means for transmitting is further configured to transmit data indicative of the power level of the signal received from the wireless communication device and the transmit power of the pilot signal.

In a further embodiment, a computer program product, comprising a computer-readable medium is provided. The computer-readable medium comprises code for causing a computer to transmit a pilot signal to a wireless communication device. The computer-readable medium further comprises code for causing a computer to obtain a power level of a signal received from a wireless communication device and a transmit power of the pilot signal. The computer-readable medium further comprises code for causing a computer to transmit data indicative of the power level of the signal received from the wireless communication device and the transmit power of the pilot signal.

DETAILED DESCRIPTION

Figure 1:
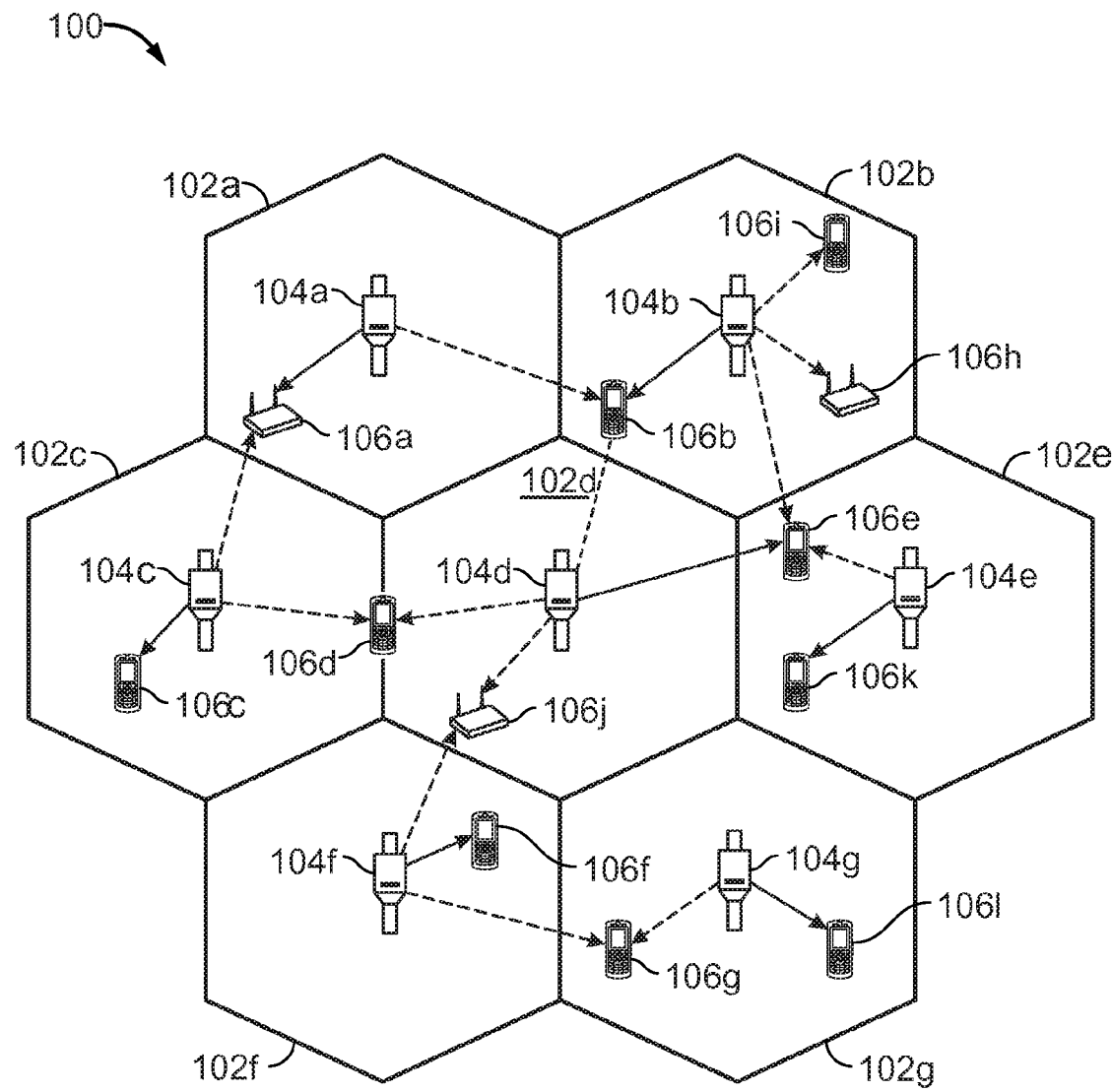
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3rd Generation (3G) networks, typically referred to as a macro cell network) and smaller scale coverage (e.g., a residence-based or building-based network environment). As an access terminal ("AT") moves through such a network, the access terminal may be served in certain locations by base stations that provide macro coverage while the access terminal may be served at other locations by home access points that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macrocell, a femtocell, or a picocell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macrocell, and so on. Also, a femto node may be configured or referred to as a Home NodeB, Home eNodeB, access point base station, femtocell, and so on.

FIG. 1 illustrates an exemplary wireless communication network 100. The wireless communication network 100 is configured to support communication between a number of users. The wireless communication network 100 may be divided into one or more cells 102a through 102g. Communication coverage in cells 102*a* through 102*g* may be provided by one or more nodes 104*a* through 104*g*. Each of the nodes 104*a* through 104*g* may provide communication coverage to corresponding cells 102*a* through 102*g*. The nodes 104*a* through 104*g* may interact with a plurality of access terminals (ATs) 106*a* through 106*l*.

Each of the ATs 106*a* through 106*l* may communicate with one or more nodes 104*a* through 104*g* on a forward link (FL) and/or a reverse link (RL) at a given moment. A FL is a communication link from a node to an AT. A RL is a communication link from an AT to a node. The nodes 104*a* through 104*g* may be interconnected, for example, by appropriate wired or wireless interfaces and may be able to communicate with each other. Accordingly, each of the ATs 106*a* through 106*l* may communicate with another one of the ATs 106*a* through 106*l* through one or more nodes 104*a* through 104*g*. For example, the AT 106*j* may communicate with the AT 106*h* as follows. The AT 106*j* may communicate with the node 104*d*. The node 104*d* may then communicate with the node 104*b*. The node 104*b* may then communicate with the AT 106*h*. Accordingly, a communication is established between the AT 106*j* and the AT 106*h*.

The wireless communication network 100 may provide service over a large geographic region. For example, the cells 102*a* through 102*g* may cover only a few blocks within a neighborhood or several square miles in a rural environment. In one embodiment, each cell may be further divided into one or more sectors (not shown).

As described above, a node (e.g., 104*a*) may provide an access terminal (AT) (e.g., AT 106*a*) access within its coverage area to a communications network, such as, for example the internet or a cellular network.

An AT (e.g., 106*a*) may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106*a*, 106*h*, and 106*j* comprise routers. ATs 106*b* through 106*g*, 106*i*, 106*k*, and 106*l* comprise mobile phones. However, each of ATs 106*a* through 106*l* may comprise any suitable communication device.

Figure 2:
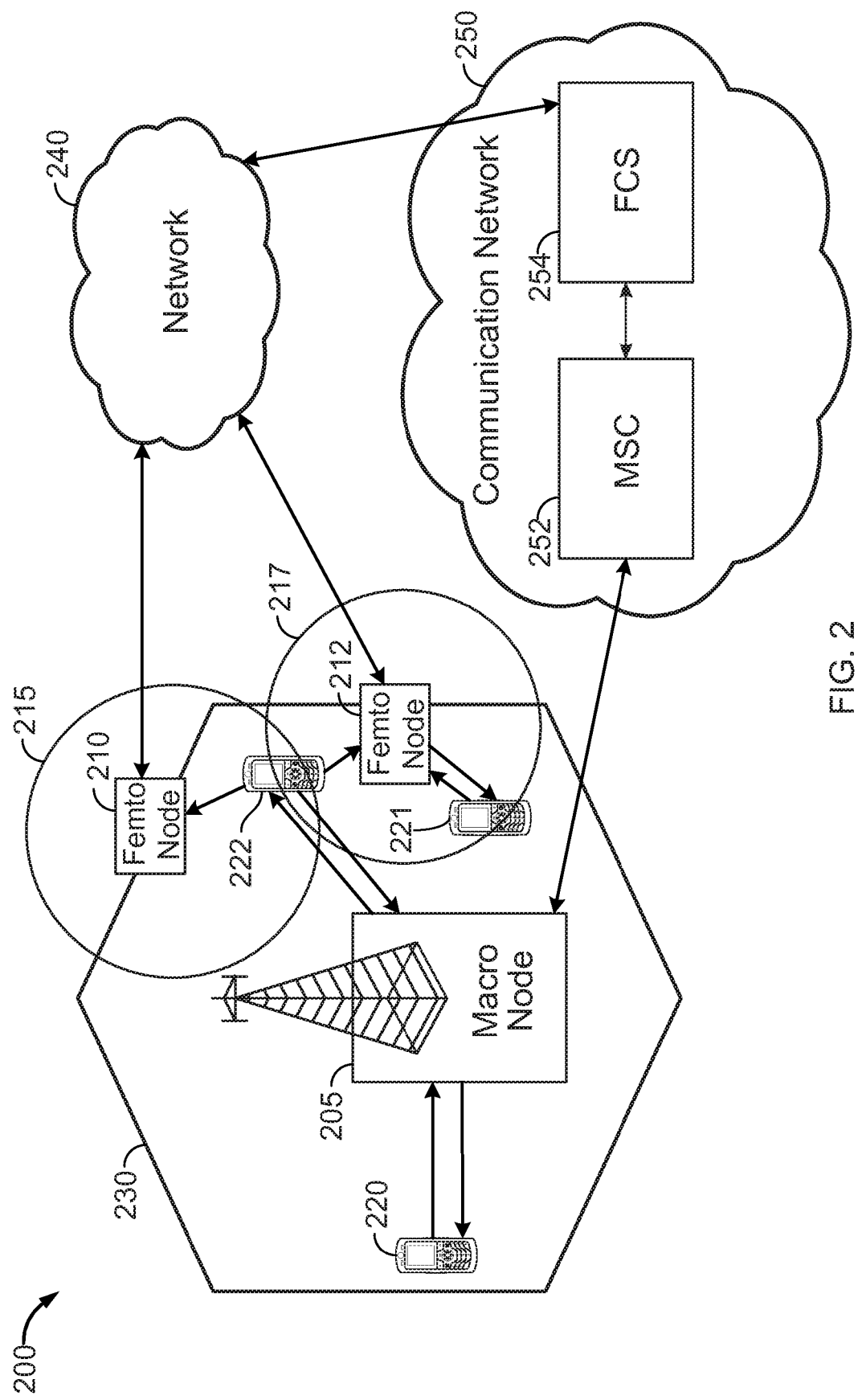
FIG. 2 illustrates exemplary interoperations of two or more communication networks.

FIG. 2 illustrates exemplary interoperations of two or more communication networks. It may be desirable for an AT 220 to transmit information to and receive information from another AT such as AT 221. FIG. 2 illustrates a manner in which the AT 220 may communicate with the AT 221. As shown in FIG. 2, the macro node 205 may provide communication coverage to access terminals within a macro area 230. For example, the AT 220 may generate and transmit a message to the macro node 205. The message may comprise information related to various types of communication (e.g., voice, data, multimedia services, etc.). The AT 220 may communicate with the macro node 205 via a wireless link. The wireless link between the AT 220 and the macro node 205 may comprise a FL (e.g., a channel and/or wireless signal transmitted from a base station to an access terminal) and a RL (e.g., a channel and/or wireless signal transmitted from an access terminal to a base station).

The macro node 205 may also communicate with a mobile switching center (MSC), such as the MSC 252 operating in the communication network 250. For example, the macro node 205 may transmit the message received from the AT 220 to the MSC 252. Generally, the MSC 252 may facilitate communication between the AT 220 and the AT 221 by first receiving the message received from the AT 220 via the macro node 205. The MSC 252 may then transmit the message to a femto convergence server (FCS), such as the FCS 254, for eventual transmission to the AT 221 via a femto node. The FCS may also be referred to as a macro femto internetworking function (MFIF), MSC/MSCe, and/or femto switch. The macro node 205 and the MSC 252 may communicate via a wired link. For example, a direct wired link may comprise a fiber optic or Ethernet link. The macro node 205 and the MSC 252 may be co-located or deployed in different locations.

The MSC 252 may also communicate with the femto convergence server (FCS) 254. Generally, the FCS 254 may facilitate communication between the 220 and the AT 221 by first receiving the message from the AT 220 via the macro node 205 and the MSC 252. The FCS 254 may then route the message to a femto node for transmission to the AT 221. The MSC 252 and the FCS 254 may communicate via a direct wired link as described above. The MSC 252 and the FCS 254 may be co-located or may be deployed in different locations.

The FCS 254 may also communicate with the Network 240 (and/or another appropriate wide area network). Generally, the Network 240 may facilitate communication between the AT 220 and the AT 221 by first receiving the message from the AT 220 via the macro node 205, the MSC 252, and the FCS 254. The Network 240 may then transmit the message to a femto node, such as the femto node 212 for transmission to the AT 221. The FCS 254 may communicate with the Network 240 via a wired or wireless link as described above.

The Network 240 may also communicate with femto nodes, such as the femto nodes 210, 212. The femto node 212 may facilitate communication between the AT 220 and the AT 221 by providing communication coverage for the AT 220 within a femto area 217. For example, the femto node 212 may receive the message originating at the AT 220 via the macro node 205, the MSC 252, the FCS 254, and the Network 240. The femto node 212 may then transmit the message to the AT 221 in the femto area 217. The femto node 212 may communicate with the AT 221 via a wireless link. The wireless link between the AT 221 and the femto node 212 may comprise a FL (e.g., a channel and/or wireless signal transmitted from a base station to an access terminal) and a RL (e.g., a channel and/or wireless signal transmitted from an access terminal to a base station).

As described above, the macro node 205, the MSC 252, the FCS 254, the Network 240, and the femto node 212 may interoperate to form a communication link between the AT 220 and the AT 221. For example, the AT 220 may transmit generate and transmit the message to the macro node 205. The macro node 205 may then transmit the message to the MSC 252. The MSC 252 may subsequently transmit the message to the FCS 254. The FCS 254 may then transmit the message to the Network 240. The Network 240 may then transmit the message to the femto node 212. The femto node 212 may then transmit the message to the AT 221. Similarly, the reverse path may be followed from the AT 221 to the AT 220.

In one embodiment, the femto nodes 210, 212 may be deployed by individual consumers and placed in homes, apartment buildings, office buildings, and the like. The femto nodes 210, 212 may communicate with the ATs in a predetermined range (e.g., 100 m) of the femto nodes 210, 212 utilizing a predetermined cellular transmission band. In one embodiment, the femto nodes 210, 212 may communicate with the Network 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link. In another embodiment, the femto nodes 210, 212 may communicate with the FCS 254 via a direct link.

The network 240 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 240 includes network variations such as the public Internet, a private network within the Internet, a secure network within the Internet, a private network, a public network, a value-added network, an intranet, and the like. In certain embodiments, network 240 may also comprise a virtual private network (VPN).

The operator of the femto node 210 may subscribe to a mobile service, such as, for example, 3G mobile service, offered through the communication network 250 (e.g., a mobile operator core network). In addition, the access terminal 222 may be capable of operating both in macro environments (e.g., macro areas) and in smaller scale (e.g., residential, femto areas, pico areas, etc.) network environments. In other words, depending on the current location of the access terminal 222, the access terminal 222 may access the communication network 250 by the macro node 205 or by any one of a set of femto nodes (e.g., femto nodes 210, 212). For example, when a subscriber is outside his home, he may be served by a macro node (e.g., node 205) and when the subscriber is at home, he may be served by a femto node (e.g., node 210). It should further be appreciated that the femto nodes 210 may be backward compatible with existing access terminals 222.

The femto node 210 may communicate over a single frequency or, in the alternative, over multiple frequencies. Depending on the particular configuration, the single frequency or one or more of the multiple frequencies may overlap with one or more frequencies used by a macro node (e.g., node 205) and/or another femto node (e.g., femto node 212).

In one embodiment, the access terminal 222 may be configured to connect to a particular (e.g., preferred) femto node (e.g., a home femto node of the access terminal 222) whenever the access terminal 222 is within communication range of the femto node. For example, the access terminal 222 may communicate with only the femto node 210 when the access terminal 222 is within the femto area 215.

In another embodiment, the access terminal 221 is communicating with a node but is not communicating with a preferred node (e.g., as defined in a preferred roaming list). In this embodiment, the access terminal 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The access terminal 222 may limit the BSR to scanning over one or more specific bands and/or channels. Upon discovery of a preferred femto node (e.g., femto node 210), the access terminal 222 selects the femto node 210 for communicating with to access the communication network 250 within the femto area 215.

In one embodiment, a node may only provide certain services to certain access terminals. Such a node may be referred to as a "restricted" or "closed" node. In wireless communication networks comprising restricted femto nodes, a given access terminal may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of access terminals. This set may be temporarily or permanently changed to include additional or fewer access terminals as necessary. In some aspects, a Closed Subscriber Group ("CSG") may be defined as the set of access nodes (e.g., femto nodes) that share a common access control list of access terminals (e.g., a list of the restricted provisioned set of access terminals). A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is closed and/or restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

As described above, multiple femto nodes 210, 212 may be deployed within the macro area 230. The deployment of multiple femto nodes 210, 212, in the macro area 230 may make it desirable to improve the process of handing off a call from the macro node 205 to the femto node 210. For example, the AT 222 may initiate a call by communicating with the macro node 205. The AT 222 may use a FL (e.g., a channel and/or wireless signal transmitted from a base station to an access terminal) and a RL (e.g., a channel and/or wireless signal transmitted from an access terminal to a base station) to communicate with the macro node 205. However, as the AT 222 moves during the call, it may be advantageous for the macro node 205 to hand off the call to femto node 210. In addition, the wireless signals transmitted by the AT 222 may be received by the femto nodes 210 and 212. For example, the AT 222 may be transmitting wireless signals to the macro node 205 and the femto nodes 210 and 212 may be within range to receive the wireless signals transmitted from the AT 222. Thus, the AT 222 may form a RL with the femto node 210 and a RL with the femto node 212 when the femto nodes 210 and 212 receive and/or process the wireless signals transmitted from the AT 222. In one embodiment, since the AT 222 is not in a call with the femto nodes 210 and 212, the AT 222 does not form FLs with the femto nodes 210 and 212.

In one example, the femto node 210 may be located at the edge of the macro area 230 where the coverage provided by the macro node 205 may begin to deteriorate. However, in the same area, the coverage provided by the femto node 210 in femto area 215 may be strong. Accordingly, it may be desirable for the macro node 205 to hand off the AT 222 to the femto node 210. In addition to alleviating deteriorating coverage, it may be desirable for the macro node 205 to hand off the AT 222 to the femto node 210 for other reasons. For example, the macro node 205 may provide communication coverage to a large number of ATs. It may be beneficial to overall system performance to offload some of the AT communication traffic from the macro node 205 by handing off ATs to femto nodes. In either case, as the femto node 212 and other femto nodes may be present, the process of handing off from the macro node 205 may require identifying which of the femto nodes 210, 212 is the intended hand in target. As additional femto nodes are deployed within the macro area 230, it may be desirable to improve the manner in which femto nodes are identified during the hand in process.

In one embodiment, the femto node 210 and/or the macro node 205 may broadcast a pilot signal. A pilot signal may comprise a known signal for determining the strength of signals received from the femto node 210 and/or the macro node 205 at an AT (e.g., AT 222). The actual received pilot signal may be compared to a reference signal at the AT 222 to determine signal quality. For example, the reference signal could be a wave form or sequence for use in comparing the actual received pilot signal. The strength of signals received from the femto node 210 and/or the macro node 205 may comprise an $E_{cp}/I_o$ ratio (energy of the pilot signal to energy of total received signal ratio) or a signal-to-noise ratio. The pilot signal may also comprise an offset pseudo noise (PN) short code. The offset PN short code may comprise a code or sequence of numbers that identifies the node and/or the node type (e.g., femto node, macro node, pico node). The offset PN short code may comprise a PN short code with a PN offset applied. The PN offset may indicate the delay from the true network synchronization time applied to a PN short code. In one embodiment, all of the nodes may use the same PN short code. However, a different PN offset may be applied to the PN short code for different nodes. Thus, the PN offset directly correlates to the offset PN short code and the terms "PN offset" and "offset PN short code" may be used interchangeably herein. In one embodiment, the PN offset may be used to identify the type of node (e.g., femto node, macro node, pico node) transmitting the pilot signal. For example, a particular set of PN offsets may be reserved for identifying femto nodes. However, the number of PN offsets available for use may be smaller than the number of femto nodes within the macro area 230. For example, 8 unique PN offsets may be set aside for use by femto nodes. However, there may be more than 8 femto nodes deployed within the macro area 230. As a result, multiple femto nodes within the macro area 230 may use the same PN offset.

In one example, an AT, such as the AT 222, in communication with a macro node, such as the macro node 205, may receive a pilot signal from a femto node, such as the femto node 210. The AT 222 may be configured to determine the PN offset and signal strength from the pilot signal and to report these values to the macro node 205. Based on the received signal strength and the PN offset, the macro node 205 may determine that a hand off to the femto node 210 should occur. For example, the macro node 205 may determine that the strength of the signal between the macro node 205 and the AT 222, the noise level, the signal to noise ratio, the maximum data rate, the throughput, the error rate, and/or other handoff criteria justify handing in the AT 222 to the femto node 210. However, because the PN offset used by the femto node 210 may not be unique, the information sent from the AT 222 to the macro node 205 may be insufficient to uniquely identify the femto node 210. For example, the femto node 212 may use the same PN offset as the femto node 210.

While the foregoing example has been described in connection with PN offsets, such examples are used for the purpose of explanation and should not be interpreted as limiting. The present systems and methods are equally applicable to other communication standards such as Universal Mobile Telecommunication System (UMTS) and Long Term Evolution (LTE). For example, in a UMTS system, a scrambling code (SC) used by a femto node may serve as an identifier which may be insufficient to uniquely identify the femto node. Similarly, in an LTE system, a physical cell identifier used by a femto node may serve as an identifier which may be insufficient to uniquely identify the femto node. In each case, additional information may be needed to uniquely identify femto nodes.

In order to facilitate handing in the AT 222 to the femto node 210 from the macro node 205, the FCS 254 may use data obtained from the femto nodes 210 and 212 to determine which of the femto nodes 210 and 212 the AT 222 should hand in to. As shown in FIG. 2, the femto nodes 210 and 212 may receive signals from the AT 222. In one embodiment, the FCS 254 may send a message to each of the femto nodes 210 and 212 instructing the femto nodes 210 and 212 to perform measurements on their respective RLs with the AT 222. For example, the FCS may send a message to the femto node 210 via the network 240, instructing the femto node 210 to measure the amount of energy the femto node 210 receives on the RL with the AT 222. The amount of energy that the femto node 210 receives on the RL from the AT 222 (e.g., $E_{cp, \text{@femto1}}$) may be calculated using the following equation:

$$E_{cp, \text{@femto1}} = PilPwr_{MAT} - PL_1 \quad (1)$$

where $PilPwr_{MAT}$ is the power of the signal transmitted by the AT 222 and $PL_1$ is the amount of path loss (e.g., the loss in power as a signal travels a certain distance) between the femto node 210 and the AT 222. In one embodiment, at least one of $PilPwr_{MAT}$ and $PL_1$ may be in terms of decibels (dB). The FCS may also send a message to the femto node 212 via the network 240, instructing the femto node 212 to measure the amount of energy the femto node 212 receives on the RL with the AT 222. The amount of energy that the femto node 212 receives on the RL from the AT 222 (e.g., $E_{cp, \text{@femto2}}$) may be calculated using the following equation:

$$E_{cp, \text{@femto2}} = PilPwr_{MAT} - PL_2 \quad (2)$$

where $PilPwr_{MAT}$ is the power of the signal transmitted by the AT 222 and $PL_2$ is the amount of path loss (e.g., the loss in power as a signal travels a certain distance) between the femto node 212 and the AT 222. In one embodiment, at least one of $PilPwr_{MAT}$ and $PL_2$ may be in terms of decibels (dB).

In one embodiment, the femto node 210 may measure the amount of energy that the femto node 210 receives on the RL from the AT 222 (e.g., $E_{cp, \text{@femto1}}$) over a specified period of time. For example, the femto node 210 may measure $E_{cp, \text{@femto1}}$ over a duration of 2 seconds. In another example, the femto node 210 may measure $E_{cp, \text{@femto1}}$ over a duration of 500 milliseconds. In another embodiment, the femto node 210 may measure $E_{cp, \text{@femto1}}$ periodically, with each measurement performed for a period of time. For example, the femto node 210 may measure $E_{cp, \text{@femto1}}$ for a period of 1 second, once every 2 seconds. In another example, the femto node 210 may measure $E_{cp, \text{@femto1}}$ for 200 milliseconds once every 800 milliseconds. The femto node 212 may measure $E_{cp, \text{@femto2}}$ similarly, as described above in conjunction with the femto node 210.

In another embodiment, a plurality of femto nodes (e.g., femto nodes 210 and 212) may each be measuring the amount of energy that each respective femto node receives on the RL from the AT 222. Each of the plurality of femto nodes may perform measurements at different times or according to different periods. The amount of energy received from the AT 222 by the plurality of femto nodes may change as the AT 222 moves in position over time. For example, the AT 222 may move farther away from the femto node 212 and close to the femto node 210. The difference in time between the measurements performed by the femto nodes may result in inaccurate measurements. For example, if the femto node 210 may measure an energy of −50 dB from the AT 222, at a first point in time. At a second point in time, the AT 222 may then move close to the femto node 212 and away from the femto node 210. At the second point in time, the femto node 212 may measure an energy of −55 dB from the AT 222. However, because the AT 222 has moved away from the femto node 210, the amount of energy received by the femto node 210 at the second point in time is −60 dB. But no measurement is performed by the femto node 210 at the second point in time. Thus, the FCS 254 may receive the first measurement of −50 dB from the femto node 210 and the second measurement of −55 dB from the femto node 212 even though these measurements may have changed over time. Thus, it may be desirable for the FCS 254 to know the duration and/or times that each of the plurality of femto nodes made measurements.

In one embodiment, the FCS 254 may inform each of the plurality of femto nodes (e.g., femto nodes 210 and 212) of specific times, durations and/or periodic intervals at or during which the plurality of femto nodes are to perform measurements. For example, the FCS 254 may inform the plurality of femto nodes (e.g., femto nodes 210 and 212) to perform measurements for 1 second at a first point in time. In another example, the FCS 254 may inform the plurality of femto nodes to perform measurements for 200 milliseconds every 500 millisecond starting at a second point in time. In another embodiment, the femto nodes may inform the FCS 254 of the specific times, durations and/or periodic intervals of measurements made by the femto nodes. For example, the femto node 210 may inform the FCS 254 that the femto node 210 made a first measurement lasting 500 milliseconds at a first time and a second measurement lasting 200 milliseconds at a second time. The FCS 254 may use the times, durations and/or periodic intervals provided by the femto nodes (e.g., femto nodes 210 and 212) to determine whether the measurements performed by the femto nodes are accurate.

In one embodiment, when performing measurements, the femto nodes (e.g., femto nodes 210 and 212) may perform the measurements continuously. In another embodiment, the femto nodes may perform measurements by taking samples over multiple time durations. In one embodiment, the measurement times of the measurements taken by the femto nodes may be long enough to remove and/or average out fast fading (e.g., a drop in the energy of a signal) which may occur on the RLs between the femto nodes and the AT 222.

In one embodiment, the femto node 210 may transmit the value $E_{cp, \text{@femto1}}$ to the FCS 254 and the femto node 212 may transmit the value $E_{cp, \text{@femto2}}$ to the FCS 254. Although the power of the signal transmitted by the AT 222 (e.g., $PilPwr_{MAT}$) may be the same value in the equations (1) and (2), the actual value of $PilPwr_{MAT}$ may not be known by the femto nodes 210 and 212. The FCS 254 may use the values $E_{cp, \text{@femto1}}$ and $E_{cp, \text{@femto2}}$ received from the femto nodes 210 and 212 to determine the difference between the path loss experienced by the femto node 210 (e.g., $PL_1$) and the path loss experienced by the femto node 212 (e.g., $PL_2$). The difference between the path loss experienced by the femto node 210 (e.g., $PL_1$) and the path loss experienced by the femto node 212 (e.g., $PL_2$) may be calculated using by combining the equations (1) and (2) into the following equation:

$$E_{cp, \text{@femto1}} - E_{cp, \text{@femto2}} = PL_2 - PL_1 \quad (3).$$

Thus, the difference in the path loss experienced by the femto node 210 and the femto node 210 may be calculated by subtracting $E_{cp, \text{@femto2}}$ from $E_{cp, \text{@femto1}}$. As shown in the equation (3), subtracting $E_{cp, \text{@femto2}}$ from $E_{cp, \text{@femto1}}$ equals $PL_2 - PL_1$.

In one embodiment, the FCS 254 may select the femto node with the best FL to the AT 222 in terms of a signal to interference ratio (e.g., SIR or $E_{cp}/I_0$). The signal to interference ratio or the $E_{cp}/I_0$ is the ratio of the amount of energy received from a node (e.g., $E_{cp, femto1}$ received from the femto node 210 or $E_{cp, femto2}$ received from the femto node 212) to the total amount of energy received (e.g., $I_o$). The total amount of energy received ($I_0$) may include things such as energy received from other transmitters (e.g., interference) and noise. If the $E_{cp}/I_0$ ratio for a first link is higher than the $E_{cp}/I_0$ ratio for a second link, this may indicate that the first link is a better link to use for transmitting and/or receiving data than the second link. For example if the $E_{cp}/I_0$ ratio for FL between the femto node 210 and the AT 222 is higher than the $E_{cp}/I_0$ ratio for FL between the femto node 212 and the AT 222, this indicates that the amount of energy received by the AT 222 from the femto node 210 (e.g., $E_{cp, femto1}$) is higher than the amount of energy received by the AT 222 from the femto node 212 (e.g., $E_{cp, femto2}$). In one embodiment, the femto node with the highest corresponding Ecp/Io measurement at the AT 222 needs to be identified in order to identify the femto node which is the hand-in target.

In one embodiment, the signal to interference ratio between the femto node 210 and the AT 222 may be calculated using the following equation in the dB domain:

$$E_{cp,femto1} - I_o = TxPilPwr_{femto1} - PL_{1b} - I_o \quad (4)$$

where $TxPilPwr_{femto1}$ is the power of the pilot signal transmitted by the femto node 210, and $PL_{1b}$ is the amount of path loss on the FL between the femto node 210 and the AT 222. The femto node 210 may provide the FCS 254 with the power of the pilot signal that the femto node 210 is transmitting (e.g., $TxPilPwr_{femto1}$). The femto node 210 may transmit this information to the FCS 254 via a message sent through the network 240. The signal to interference ratio between the femto node 212 and the AT 222 may be calculated using the following equation in the dB domain:

$$E_{cp,femto2} - I_o = TxPilPwr_{femto2} - PL_{2b} - I_o \quad (5)$$

where $TxPilPwr_{femto2}$ is the pilot power of the signal transmitted by the femto node 212, and $PL_{2b}$ is the amount of path loss on the FL between the femto node 212 and the AT 222. The femto node 212 may provide the FCS 254 with the power of the pilot signal that the femto node 212 is transmitting (e.g., $TxPilPwr_{femto2}$). The femto node 212 may transmit this information to the FCS 254 via a message sent through the network 240. It is noted that in the dB domain, the signal to interference ration is shown as a subtraction, such as shown in equations (4) and (5).

Because the total amount of energy received on a particular FL carrier by AT 222 (e.g., $I_0$) is the same as other FLs, the term $I_0$ may be removed from the equations (4) and (5) and the equations (4) and (5) may be combined into the following equation:

$$E_{cp,femto1} - E_{cp,femto2} = (TxPilPwr_{femto1} - TxPilPwr_{femto2}) + (PL_{2b} - PL_{1b}) \quad (6)$$

If the above equation (6) is a positive value, this means that the first femto node 220 has a higher Ecp/Io measurement at the AT 222 and is the actual hand in target node. In one embodiment, the difference in the path loss of the FL between the femto node 210 and the AT 222, and the FL between the femto node 212 and the AT 222 may be calculated as $PL_2 - PL_1$. The difference in the path loss of the FL between the femto node 210 and the AT 222, and the FL between the femto node 212 and the AT 222 (e.g., $PL_2 - PL_1$) may not be known. In one embodiment, the FCS 254 may use the difference in the path loss on the RLs between the femto nodes 210 and 212, and the AT 222 as shown in the equation (3) (e.g., $PL_2 - PL_1$) and substitute the value $PL_2 - PL_1$ for the value $PL_{2b} - PL_{1b}$ in the equation (6). The amount of path loss on the RLs between the femto nodes 210 and 212, and the AT 222 may be similar to the amount of path loss on the FLs between the femto nodes 210 and 212, and the AT 222. Substituting $PL_2 - PL_1$ for $PL_{2b} - PL_{1b}$ results in the following equation:

$$E_{cp,femto1} - E_{cp,femto2} = (TxPilPwr_{femto1} - TxPilPwr_{femto2}) + (PL_2 - PL_1) \quad (7).$$

As shown in the equation (3), $PL_2 - PL_1$ equals $E_{cp, @ femto1} - E_{cp, @ femto2}$ and $E_{cp, @ femto1} - E_{cp, @ femto2}$ can be substituted for the term $PL_2 - PL_1$. Substituting $E_{cp, @ femto1} - E_{cp, @ femto2}$ for $PL_2 - PL_1$ results in the following equation:

$$E_{cp,femto1} - E_{cp,femto2} = (TxPilPwr_{femto1} + E_{cp, @ femto1}) - (TxPilPwr_{femto2} + E_{cp, @ femto2}) \quad (8).$$

Equation 8 shows that the sum of the transmit pilot power of a femto node (e.g., $TxPilPwr_{femto1}$) and the energy received by the femto node from an AT (e.g., $E_{cp, @ femto1}$) may be an equivalent metric to the FL signal strength (e.g., $E_{cp, femto1}$) from the femto cell (e.g., the femto node 210). This is true because the difference in FL $E_{cp}$ from different femtocells is equivalent to difference in the sum of transmit pilot power and the RL $E_{cp}$, as shown in the above equations 7 and 8.

As discussed above, the femto node 210 may provide the FCS 254 with the values for $TxPilPwr_{femto1}$ and $E_{cp, @ femto1}$. Also as discussed above, the femto node 212 may provide the FCS 254 with the values for $TxPilPwr_{femto2}$ and $E_{cp, @ femto2}$. By ranking the sum of the above-values provided by the femto nodes 210 and 212, the FCS 254 may compare the amount of energy received by the AT 222 from the femto node 210 (e.g., $E_{cp, femto1}$) and the amount of energy received by the AT 222 from the femto node 212 (e.g., $E_{cp, femto2}$). Depending on whichever is larger between the amount of energy received by the AT 222 from the femto node 210 (e.g., $E_{cp, femto1}$) and the amount of energy received by the AT 222 from the femto node 212 (e.g., $E_{cp, femto2}$), the FCS 254 may determine which of the femto nodes 210 and 212 the AT 222 should hand in to. For example, if the value of $E_{cp, femto1} - E_{cp, femto2}$ is a positive number, then $E_{cp, femto1}$ is a higher value than $E_{cp, femto2}$ which indicates that the femto node 210 has a stronger FL with the AT 222 than the femto node 212. Thus, the femto node 210 may be the hand in target. In another example, if the value of $E_{cp, femto1} - E_{cp, femto2}$ is a negative number, then $E_{cp, femto2}$ is a higher value than $E_{cp, femto1}$ which indicates that the femto node 212 has a stronger FL with the AT 222 than the femto node 210. Thus, the femto node 212 may be the hand in target.

In one embodiment, a femto node 210 may perform inaccurate measurements due to calibration problems in the components of the femto node 210. The femto node may apply a "weight" value to the amount of energy received by the AT 222 from the femto node 210 (e.g., $E_{cp, femto1}$) in order to compensate for this inaccuracy. For example, the femto node 210 may apply a weight of 0.8 to $E_{cp, femto1}$ (e.g., multiplying the value of $E_{cp, femto1}$ by 0.8) before summing it with $TxPilPwr_{femto1}$. In another embodiment, a variety of weights may be used for any of the values $TxPilPwr_{femto1}$ and $E_{cp, femto1}$. For example, a weight of 1.3 may be applied to $TxPilPwr_{femto1}$ and a weight of 0.7 may be applied to $E_{cp, femto1}$.

In one embodiment, the femto node 210 may use a beacon signal. For example, the femto node 210 may transmit a beacon signal on a first frequency and/or channel. But the femto node 210 may actually communicate with devices such as AT 222 on a second frequency and/or channel. The beacon signal may be used to allow the femto node 210 to be detected by more devices such as AT 222, which may be using different frequencies and/or channels. In one embodiment, the femto node 210 may use the transmit power of the beacon signal for the value of the term $TxPilPwr_{femto1}$. In another embodiment, the femto node 210 may use the transmit power of the pilot signal for the actual frequency and/or channel the femto node 210 uses to communicate with the AT 222, for the value of the term $TxPilPwr_{femto1}$.

Although FIG. 2 has been described using only two femto nodes 210 and 212, the above equations (1) through (8) may be applied for any different number of femto nodes. In one embodiment, the FCS 254 may obtain the power of the signal transmitted by femto node (e.g., $TxPilPwr_{femto1}$) and the amount of energy that the femto node receives on the RL from an AT 222 (e.g., $E_{cp, @ femto1}$), for each of a plurality of femto nodes. For example, the FCS 254 may obtain the values $TxPilPwr_{femto1}$ and $E_{cp, @ femto1}$ for the femto node 210, the values TxPilPwr$_{femto2}$ and E$_{cp, @ femto2}$ for the femto node 212, and the values TxPilPwr$_{femto3}$ and E$_{cp, @ femto3}$ for a third femto node (not shown in FIG. 2). The FCS 254 may combine the values received for each femto node and rank the combined values for each femto node. For example, the FCS 254 may add TxPilPwr$_{femto1}$ and E$_{cp, @ femto1}$ for the femto node 210, add TxPilPwr$_{femto2}$ and E$_{cp, @ femto2}$ for the femto node 212, and add TxPilPwr$_{femto3}$ and E$_{cp, @ femto3}$ for a third femto node (not shown in FIG. 2). In one embodiment, both of these values may be in dB domain. The FCS 254 may rank the combined values in a certain order (e.g., largest to smallest or smallest to largest). The FCS 254 may select the femto node with the largest combined value as the hand in target. For example, TxPilPwr$_{femto1}$ added to E$_{cp, @ femto1}$ may equal −100 for the femto node 210, TxPilPwr$_{femto2}$ added to E$_{cp, @ femto2}$ may equal −90 for the femto node 212, and TxPilPwr$_{femto3}$ added to E$_{cp, @ femto3}$ may equal −95 for a third femto node (not shown in FIG. 2). Based on the combined values, the FCS 254 may select the combined value of 60 because 60 is the largest number and the FCS 254 may select the femto node 210 as the hand in target.

In one embodiment, the femto node 210 may send the values TxPilPwr$_{femto1}$ and E$_{cp, @ femto1}$ as separate values. For example, the femto node 210 may send a measurement report (e.g., a report with measurement information) to the FCS 254 comprising at least the value TxPilPwr$_{femto1}$ and the value E$_{cp, @ femto1}$. In another embodiment, the femto node 210 may send the values TxPilPwr$_{femto1}$ and E$_{cp, @ femto1}$ as a combined value. For example, the femto node 210 may add the values TxPilPwr$_{femto1}$ and E$_{cp, @ femto1}$ into a combined value Pwr$_{combinedFemto1}$. The femto node may send a measurement report to the FCS 254 comprising at least the value Pwr$_{combinedFemto1}$.

Figure 3:
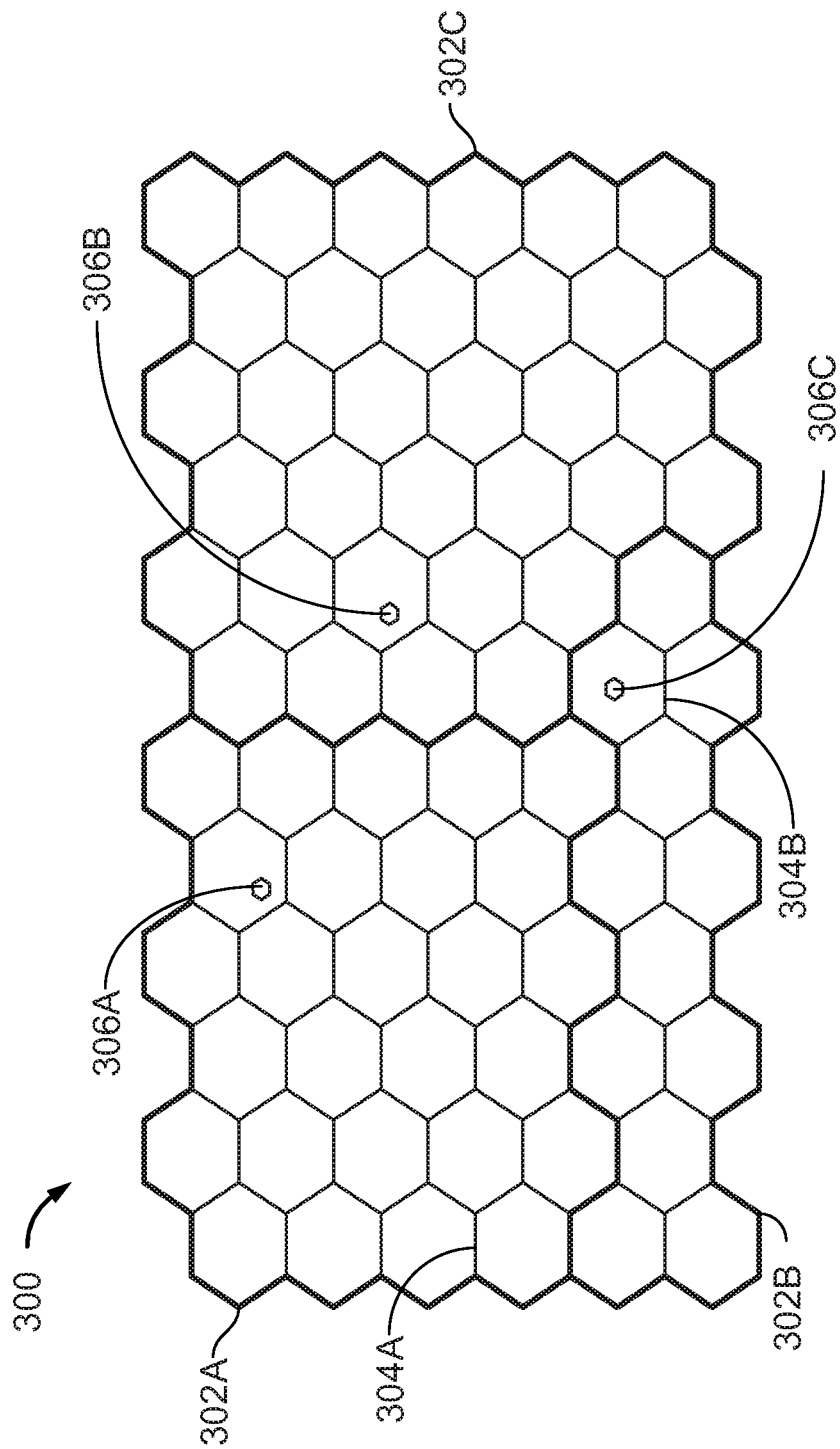
FIG. 3 illustrates exemplary coverage areas of the wireless communication networks shown in FIG. 1.

FIG. 3 illustrates exemplary coverage areas of the wireless communication networks 100 shown in FIG. 1. The coverage area 300 may comprise one or more geographical areas in which an AT (e.g., the AT 220 shown in FIG. 2) may access a network (e.g., the network 240 shown in FIG. 2). As shown the coverage area 300 comprises several tracking areas 302A through 302C (or routing areas or location areas). Each of the tracking areas 302A through 302C comprises several macro areas such as 304A and 304B, which may be similar to the macro area 230 described above with respect to FIG. 2. Here, areas of coverage associated with tracking areas 302A, 302B, and 302C are shown as delineated by bolded lines, and the macro areas such as 304A and 304B are represented by hexagons. The tracking areas 302A through 302C may also comprise femto areas such as femto areas 306A through 306C, which may be similar to the femto area 230 described above with respect to FIG. 2. In this example, each of the femto areas (e.g., femto area 306C) is depicted within a macro area (e.g., macro area 304B). It should be appreciated, however, that a femto area (e.g., femto area 306C) may not lie entirely within a macro area (e.g., macro area 304B). In practice, a large number of femto areas (e.g., femto area 306C) may be defined with a given tracking area (e.g., tracking area 302B) or macro area (e.g., macro area 304B). Also, one or more pico areas (not shown) may be defined within a given tracking area (e.g., tracking area 302B) or macro area (e.g., macro area 304B).

Figure 4:
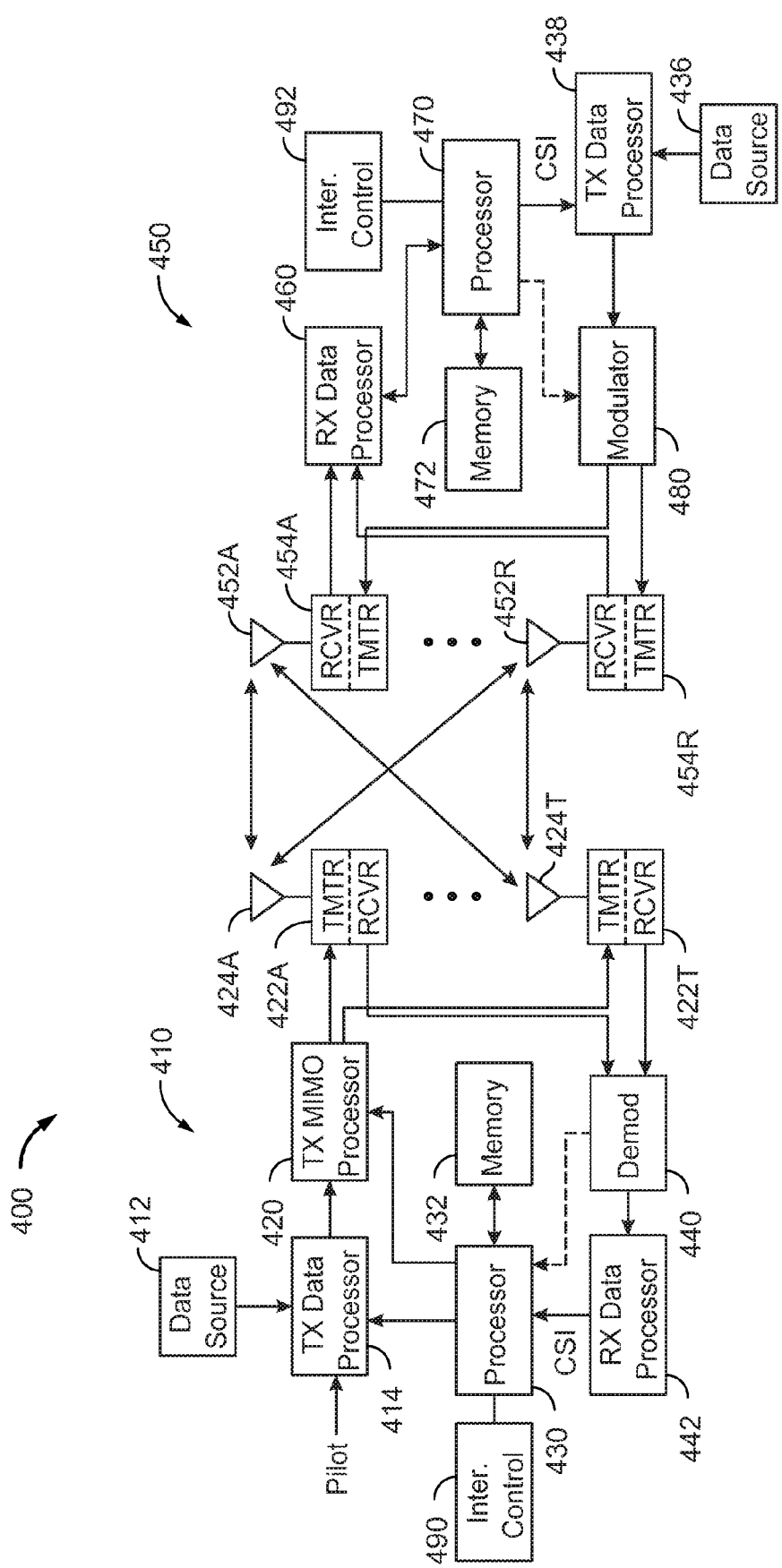
FIG. 4 is a functional block diagram of a first exemplary femto node and a first exemplary access terminal in one of the communication networks of FIG. 2.

FIG. 4 is a functional block diagram of a first exemplary femto node 410 and a first exemplary access terminal 450 in one of the communication networks of FIG. 2. As shown, a MIMO system 400 comprises a femto node 410 and an access terminal 450 (e.g., the AT 222). At the femto node 410, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the femto node 410.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beamforming weights to the symbols of the data streams and to the antenna from which the symbol is being transmitted.

Each of transceivers 422A through 422T receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the femto node 450, the transmitted modulated signals are received by NR antennas 452A through 452R and the received signal from each of antennas 452A through 452R is provided to a respective transceiver ("XCVR") 454A through 454R. Each of transceivers 454A through 454R conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454A through 454R based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the femto node 410.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the femto node 450.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmits the data streams back to the femto node 410.

At the femto node 410, the modulated signals from the femto node 450 are received by the antennas 424A through 424T. Further, the transceivers 422A through 422T condition the modulated signals. A demodulator ("DEMOD") 440 demodulates the modulated signals. A RX data processor 442 processes the demodulated signals and extracts the reverse link message transmitted by the femto node 450. The processor 430 then determines which pre-coding matrix to use for determining the beam-forming weights. Further, the processor 430 processes the extracted message.

Further, the femto node 410 and/or the femto node 450 may comprise one or more components that perform interference control operations as taught herein. For example, an interference ("INTER") control component 490 may cooperate with the processor 430 and/or other components of the femto node 410 to send/receive signals to/from another device (e.g., femto node 450) as taught herein. Similarly, an interference control component 492 may cooperate with the processor 470 and/or other components of the femto node 450 to send/receive signals to/from another device (e.g., femto node 410). It should be appreciated that for each femto node 410 and 450 the functionality of two or more of the described components may be provided by a single component. For example, a single processing component may provide the functionality of the interference control component 490 and the processor 430. Further, a single processing component may provide the functionality of the interference control component 492 and the processor 470.

Figure 5:
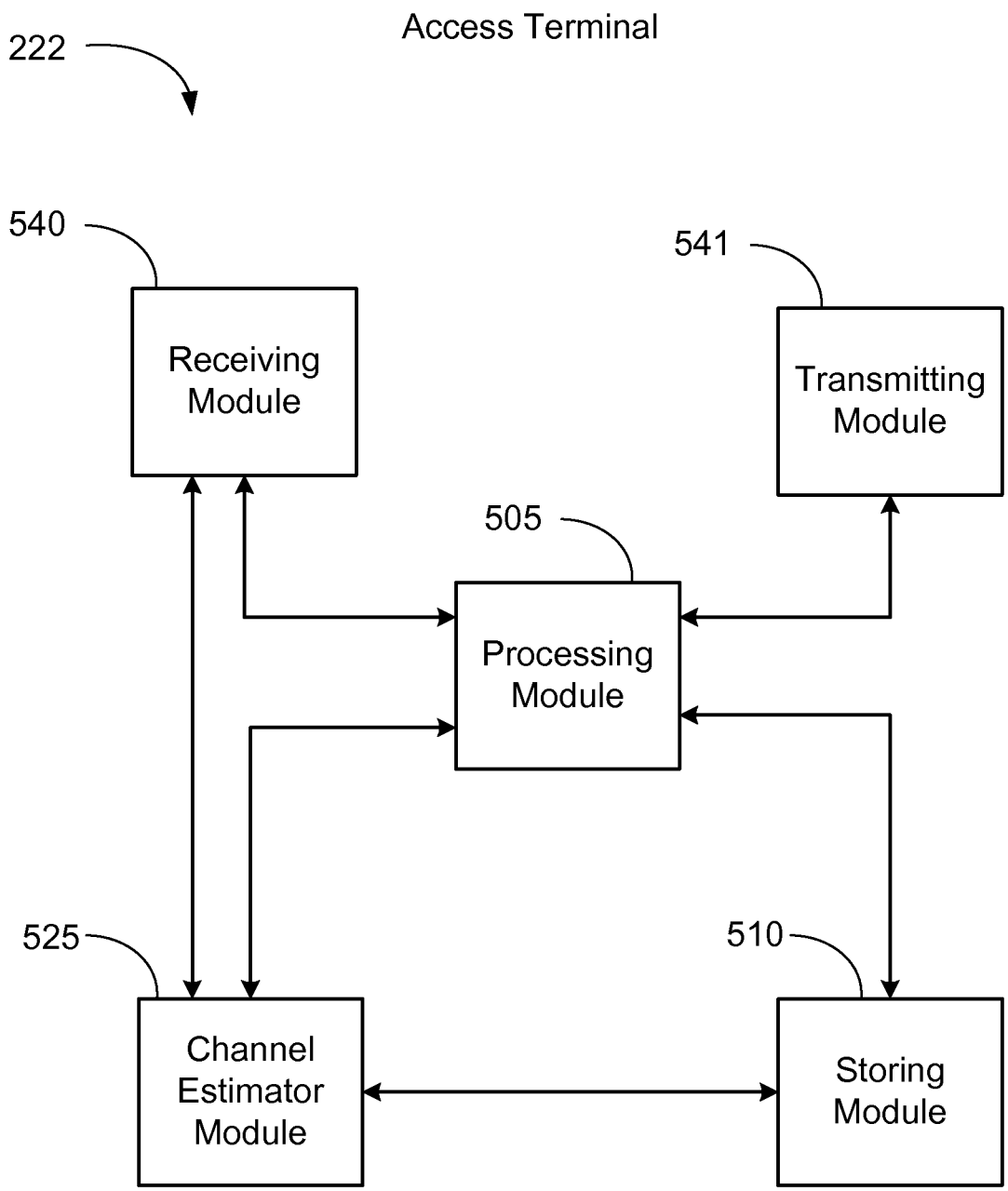
FIG. 5 is a functional block diagram of a second exemplary access terminal of one of the communication networks of FIG. 2.

FIG. 5 is a functional block diagram of a second exemplary access terminal 222 of one of the communication networks of FIG. 2. As discussed above in FIG. 2, the AT 222 may be a mobile phone used to communicate information to and/or from the macro node 205.

The AT 222 may comprise a receiving module 540 configured to receive an inbound wireless message and/or wireless signals from the macro node 205 and/or other devices. The receiving module 540 may be configured to measure conditions of the wireless link (e.g., the RL and the FL) between the AT 222 and the macro node 205. In one embodiment, the receiving module 540 may measure at least one of a data rate, noise, signal power, and signal to noise ratio of the wireless link between the macro node 205 and the AT 222. In another embodiment, the receiving module 540 may provide data indicative of the conditions of the wireless link (e.g., noise level, signal power, and/or signal to noise ratio) to a processing module 505. In one embodiment, the receiving module 540 may also measure signals received from femto nodes (e.g., femto node 212).

The AT 222 may also comprise a channel estimator module 525 which may be coupled to the receiving module 540, a processing module 505 and a storing module 510. In one embodiment, the channel estimator module 525 may measure at least one of a data rate, noise, signal power, and signal to noise ratio of the wireless link between the macro node 205 and the AT 222 using the receiving module 540. In another embodiment, the channel estimator module 525 may measure conditions of the wireless link between the AT 222 and the femto node 210. In a further embodiment, the channel estimator module 525 may provide data indicative of the conditions of the wireless link to the processing module 505. The channel estimator module 525 may be coupled to the storing module 510 to store, read and access data in the storing module 510. In another embodiment, the channel estimator module 525 may determine that the quality of the wireless link (e.g., the RL and/or the FL) between the AT 222 and the macro node 205 has degraded, and that the AT 222 should search for a femto node (e.g., femto node 210) to hand in to. In one embodiment, the channel estimator module 525 may use the receiving module 540 to measure signals received from femto nodes. In another embodiment, the channel estimator module 525 may use the measurements made by the receiving module 540 and may generate a measurement message (e.g., a message containing information about power measurements for femto nodes). Alternatively, the channel estimator module may use the processing module 505 to generate the measurement message. The channel estimator module 525 may also provide the measurement message to the transmitting module 541, so that the measurement message may be transmitted to the FCS 254 via the macro node 205, and the MSC 252. In one embodiment, the measurement message may comprise a pilot strength measurement message (PSMM) which may comprise a PN offset for a femto node and/or a FL signal strength (e.g., a signal to noise ratio) for a femto node (e.g., femto node 210). In another embodiment, the measure message may also comprise an identifier for the AT 222 (e.g., a medium access control (MAC) address, an International Mobile Subscriber Identity (IMSI), and/or an international mobile equipment identity (IMEI)).

The transmitting module 541 may be configured to transmit an outbound wireless message and/or wireless signals to the femto node 210 and/or other devices. For example, the transmitting module 541 may be configured to transmit an access probe (e.g., a registration request to determine if access is allowed to the femto node) to the femto node 210 in order to establish the wireless link between the AT 222 and the femto node 210.

A processing module 505 may be coupled to both the receiving module 540 and the transmitting module 541. The processing module 505 may be configured to process information for storage, transmission, and/or for the control of other components of the AT 222. The processing module 505 may further be coupled to a storing module 510. The storing module 510 may be configured to store information before, during or after processing. The receiving module 540 may pass the inbound wireless message to the processing module 505 for processing. The processing module 505 may store the inbound wireless message in the storing module 510. The processing module 505 may also read information from or write information to the storing module 510. The processing module 505 may process the outbound wireless message passing the outbound wireless message to the transmitting module 541 for transmission. The processing module 505 may obtain the outbound wireless message from the storing module 510 and/or may use data obtained from the storing module 510 to process the outbound wireless message. In one embodiment, the processing module 505 may obtain data indicative of the conditions of the wireless link from the receiving module 540. The processing module 505 may process the data indicative of the conditions of the wireless link. In another embodiment, the processing module 505 may also store the data indicative of the conditions of the wireless link in the storing module 510.

In one embodiment, the receiving module 540 may receive a handover message instructing the AT 222 to hand in to the femto node 210. The receiving module 540 may receive the handover message and pass the handover message to the processing module 505 for processing. The processing module may process the handover message and may communicate with the receiving module 540, the transmitting module 541 and the storing module 510 to facilitate the hand in of the AT 222 to the femto node 210.

The receiving module 540 and the transmitting module 541 may comprise an antenna (not shown in FIG. 5). The receiving module 540 may be configured to demodulate the inbound wireless messages coming from femto node 210 and/or the macro node 205. The transmitting module 541 may be configured to modulate the outbound wireless message going to the femto node 210 and/or the macro node 205. The outbound wireless messages may be transmitted via the antenna and the inbound wireless messages may be received via the antenna. The antenna may be configured to communicate with the femto node 210 and macro node 205 over one or more channels. The outbound and/or inbound wireless messages may comprise voice and/or data-only information (collectively referred to herein as "data"). The processing module 505 and/or the channel estimator module 525 may provide data to be transmitted.

The storing module 510 may comprise processing module cache, including a multi-level hierarchical cache in which different levels have different capacities and access speeds. The storing module 510 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the access terminal 222 need not be separate structural elements. For example, the processing module 505 and the storing module 510 may be embodied in a single chip. The processing module 505 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the AT 222, such as the processing module 505 and the channel estimator module 515 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the AT 222 may also be implemented as a combination of computing devices, e.g., a combination of a DSP and a microprocessor, a plurality of microprocessors, one or more microprocessors in conjunction with a DSP communication, or any other such configuration.

Figure 6:
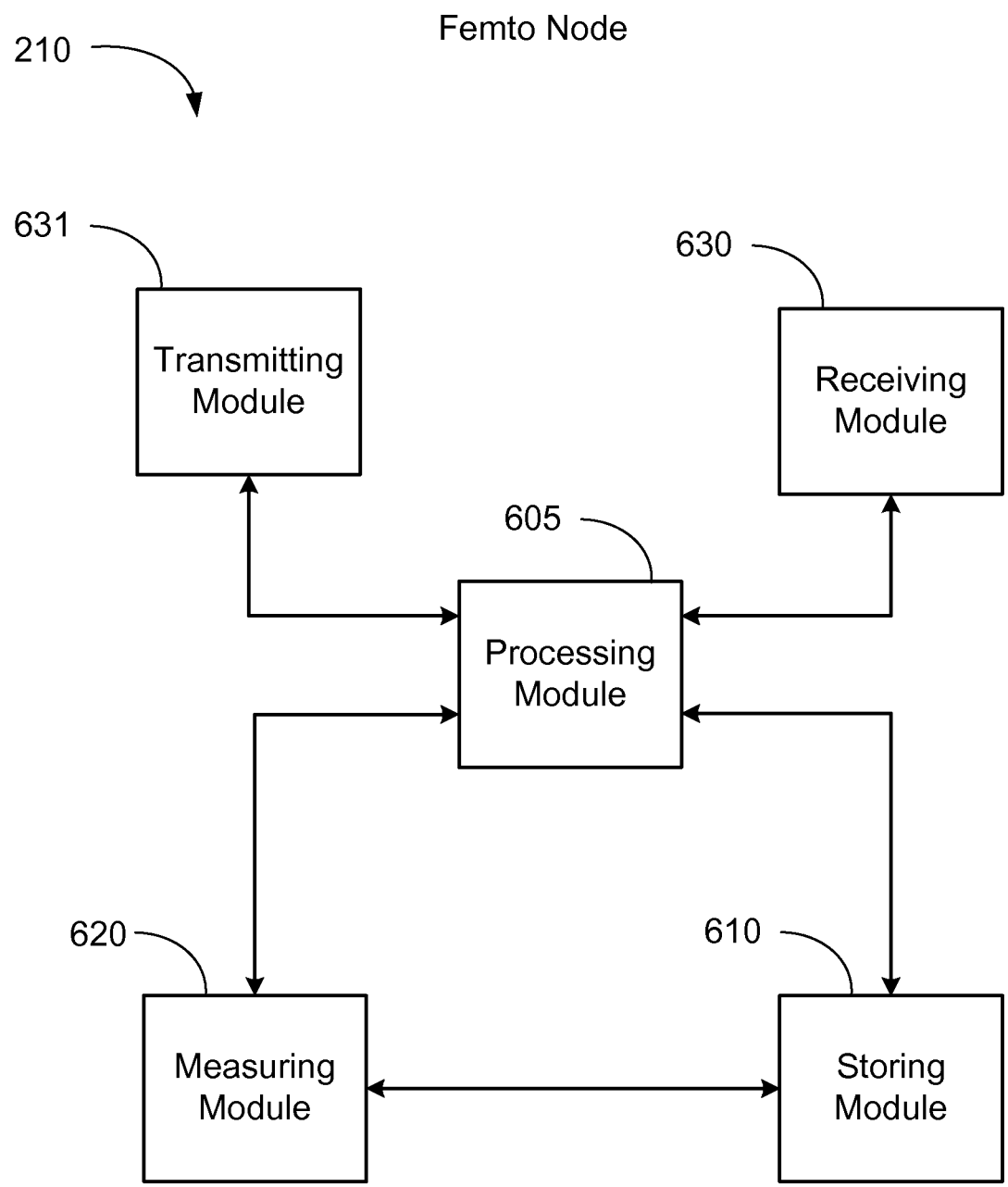
FIG. 6 is a functional block diagram of a second exemplary femto node of one of the communication networks of FIG. 2.

FIG. 6 is a functional block diagram of a second exemplary femto node 210 of one of the communication networks of FIG. 2. As discussed above with respect to FIG. 2, the femto node 210 may be a hand in target for the AT 221.

The femto node 210 may comprise a receiving module 630 configured to receive wireless signals (e.g., inbound wireless messages) transmitted by the AT 222 and/or other devices. In one embodiment, the receiving module 630 is configured to receive a measurement request (e.g., a request for the femto node 210 to perform measurements) from the FCS 254 via the network 240. The measurement request may comprise an identifier for an AT, such as an identifier for AT 222 (e.g., a medium access control (MAC) address, an International Mobile Subscriber Identity (IMSI), a long code mask (e.g., a code for identifying the AT 222) and/or an international mobile equipment identity (IMEI)). The measurement request may also comprise data indicative of times, durations and/or periodic intervals at or during which the femto node 210 is to perform measurements, as discussed above in FIG. 2. The femto node 210 may also comprise a transmitting module 631. The transmitting module 631 may be configured to transmit wireless signals to the AT 222. The transmitting module 631 may also send an outbound message to the AT 222. The transmitting module 631 may also send outbound messages to other devices. The receiving module 630 and the transmitting module 631 may be coupled to the processing module 605. The receiving module 630 and the transmitting module 631 may also be configured to receive an inbound wired message from and pass an outbound message to the network 240, respectively. The receiving module 630 may pass the inbound wired message to the processing module 605 for processing. The receiving module 630 may also pass the measurement request to the processing module 605 for processing. The processing module 605 may process and pass the wired outbound message to the transmitting module 631 for transmission to the network 240.

The processing module 605 may further be coupled, via one or more buses, to a storing module 610. The processing module 605 may read information from or write information to the storing module 610. For example, the storing module 610 may be configured to store the measurement request received from the processing module 605 and the receiving module 630. The processing module 605 may also be configured to control other components of the femto node 210. The processing module 605 may also be coupled to a measuring module 620. The measuring module 620 may also process the measurement request received from the processing module 605 and the receiving module 630. The measuring module 620 may determine that measurements are needed on the RL from the AT 222, based on, at least in part, the contents of the measurement request (e.g., an identifier for the AT 222). The measuring module 620 may be configured to measure the amount of pilot energy the femto node 210 receives on the RL from the AT 222 (e.g., $E_{cp, @femto1}$), based on, at least in part, the measurement request. The measuring module 620 may use the receiving module 640 when measuring the amount of pilot energy the femto node 210 receives on the RL from the AT 222 (e.g., $E_{cp, @femto1}$). The measuring module 620 may also generate a measurement report. The measurement report may comprise the amount of pilot energy the femto node 210 receives on the RL from the AT 222 (e.g., $E_{cp, @femto1}$) and/or the pilot transmit power of the femto node 210, as discussed above in FIG. 2. For further information regarding the functions the measuring module 620 may perform, see the written description for FIGS. 2 and 10.

After generating the measurement report, the measuring module 620 may wait for a handover message to be received via the receiving module 630. If a handover message arrives, the measuring module 620 may determine that the femto node 210 has been selected as a hand in target, and may prepare to accept the hand in of the AT 222 from the macro node 205. If no handover message, the measuring module 620 may determine that the femto node 210 is not selected as the hand in target.

The receiving module 630 and the transmitting module 631 may comprise or may be connected to at least one antenna (not shown in FIG. 6). The transmitting module 631 may be configured to modulate the wireless outbound messages going to the AT 222. The receiving module 631 may be configured to demodulate the inbound messages coming from AT 222. The wireless outbound messages may be transmitted via the at least one antenna and the inbound message may be received via the at least one antenna. The at least one antenna may be configured to send and/or receive the outbound and inbound wireless messages to and from the AT 222 over one or more channels. The outbound and inbound messages may comprise voice and/or data-only information (collectively referred to herein as "data"). The receiving module 630 may demodulate the data received. The transmitting module 631 may modulate data to be sent from the femto node 210 via the wireless network interface 610. The processing module 605 may provide data to be transmitted.

The receiving module 630 and the transmitting module 631 may comprise a modem. The modem may be configured to modulate the outbound wired messages going to the network 240. The modem may also be configured to modulate the inbound wired messages coming from the network 240. The receiving module 630 may demodulate data received. The demodulated data may be transmitted to the processing module 605. The transmitting module 631 may modulate data to be sent from the femto node 210 via the wired network interface 630. The processing module 605 and/or the measuring module 620 may provide data to be transmitted.

The storing module 610 may comprise processing module cache, including a multi-level hierarchical cache in which different levels have different capacities and access speeds. The storing module 610 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the femto node 210 need not be separate structural elements. For example, the processing module 605 and the storing module 610 may be embodied in a single chip. The processing module 605 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the femto node 210, such as the processing module 605 and the measuring module 620, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 210 may also be implemented as a combination of computing devices, e.g., a combination of a DSP and a microprocessor, a plurality of microprocessors, one or more microprocessors in conjunction with a DSP communication, or any other such configuration.

Figure 7:
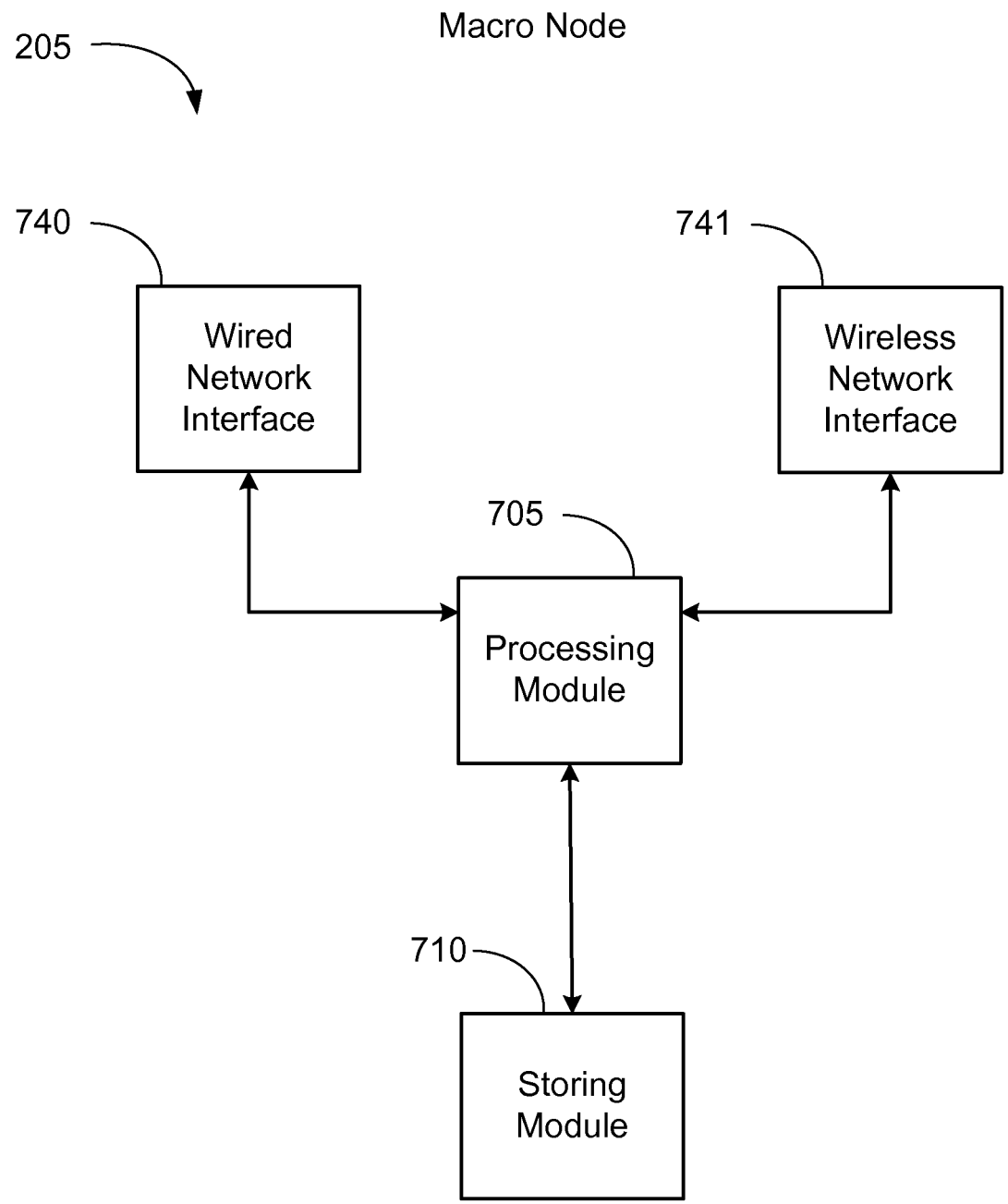
FIG. 7 is a functional block diagram of an exemplary macro node shown in FIG. 2.

FIG. 7 is a functional block diagram of an exemplary macro node 205 shown in FIG. 2. As discussed above with respect to FIG. 2, the macro node 205 may be a base station of a cellular or a mobile communication network. The macro node 205 may also facilitate a hand in from the macro node 205 to the femto node 210 by receiving a measurement message from the AT 222 and transmitting the measurement message to the MSC 252. The macro node 205 may comprise a wireless network interface 741 configured to receive a measurement message from and transmit an outbound wireless message to the AT 222. Wireless network interface 741 may be coupled to the processing module 705. The processing module 705 may be configured to process the measurement message and outbound wireless message coming from or going to the AT 222 via the wireless network interface 741. The processing module 705 may also be configured to control other components of the macro node 205. The processing module 705 may be further coupled to a wired network interface 740. The wired network interface 740 may be configured to receive an inbound wired message from and to transmit the measurement message to the MSC 252. The wired network interface 740 may receive an inbound wired message and pass the inbound wired message to the processing module 705 for processing. The processing module 705 may process an outbound wired message (e.g., the measurement message) and pass the outbound wired message to the wired network interface 740 for transmission to the MSC 252. In one embodiment, the processing module 705 may add to the measurement message an identifier for the macro node 205 (e.g., a scrambling code) from which the MSC 252 received the measurement message from. In another embodiment, the processing module 705 may generate a separate outbound message comprising the identifier for the macro node 205 from which the MSC 252 received the measurement message from. The identifier for the macro node 205 may be used by the FCS 254 as described below in FIGS. 9 and 11.

The processing module 705 may further be coupled, via one or more buses, to a storing module 710. The processing module 705 may read information from or write information to the storing module 710. The storing module 710 may be configured to store information for use in processing the inbound or outbound, wired or wireless message. The storing module 710 may also be configured to store the measurement message.

The wireless network interface 741 may comprise an antenna and a transceiver. The transceiver may be configured to modulate/demodulate the outbound/inbound wireless messages going to or coming from the AT 222. The inbound/outbound wireless messages may be transmitted/received via the antenna. The antenna may be configured to send and/or receive the outbound/inbound wireless messages from the macro node 205 over one or more channels. The outbound/inbound wireless messages may comprise voice and/or data-only information (collectively referred to herein as "data"). The wireless network interface 741 may demodulate the data received. The wireless network interface 741 may modulate data to be sent from the macro node 205 via the wireless network interface 741. The processing module 705 may provide data to be transmitted.

The wired network interface 740 may comprise a modem. The modem may be configured to modulate/demodulate the outbound/inbound wired message going to or coming from the MSC 252. The wired network interface 740 may demodulate the data received according to one or more wired standards using methods known in the art. The demodulated data may be transmitted to the processing module 705. The wired network interface 740 may modulate data to be sent from the macro node 741 via the wired network interface 740 according to one or more wired standards using methods known in the art. The processing module 705 may provide data to be transmitted.

The storing module 710 may comprise processor cache, including a multi-level hierarchical cache in which different levels have different capacities and access speeds. The storing module 710 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the macro node 205 need not be separate structural elements. For example, the processing module 705 and the storing module 710 may be embodied in a single chip. The processing module 705 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the macro node 205, such as processing module 705 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the macro node 205 may also be implemented as a combination of computing devices, e.g., a combination of a DSP and a microprocessor, a plurality of microprocessors, one or more microprocessors in conjunction with a DSP communication, or any other such configuration.

Figure 8:
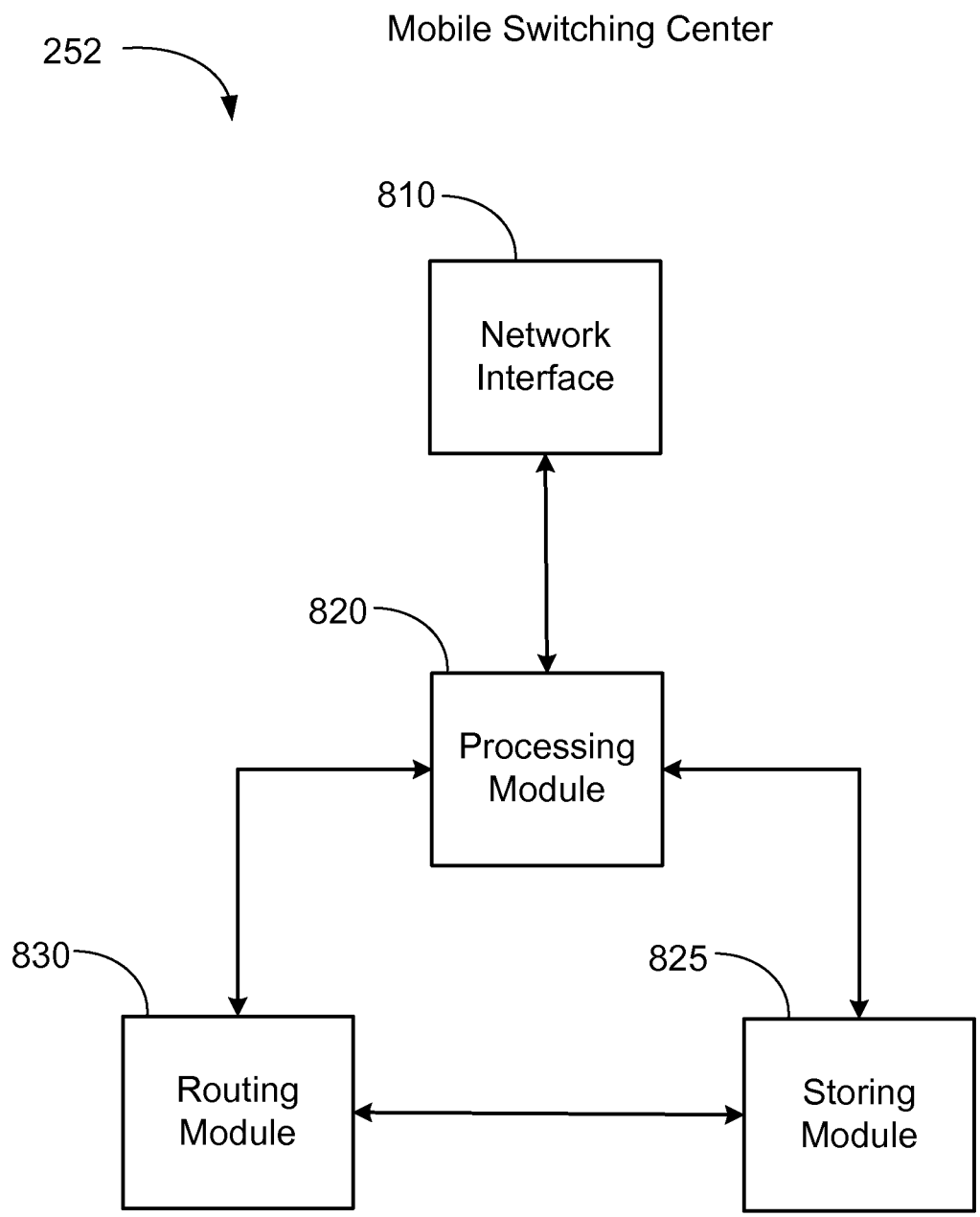
FIG. 8 is a functional block diagram of an exemplary mobile switching center shown in FIG. 2.

FIG. 8 is a functional block diagram of an exemplary mobile switching center (MSC) 252 shown in FIG. 2. As described above with respect to FIG. 2, the MSC 252 may operate as a router configured to route messages between the macro node 205 and the FCS 254. The MSC 252 may comprise a network interface 810 configured to receive a measurement message from and to transmit an outbound message to the macro node 205 or the FCS 254. The network interface 810 may be coupled to a processing module 820. The processing module 820 may be configured to process the measurement message received by the network interface 810 and the outbound message transmitted by the network interface 810. The processing module 820 may further be coupled, via one or more buses, to a storing module 825. The processing module 820 may read information from or write information to the storing module 825. The storing module 825 may be configured to store the inbound and outbound message before, during, or after processing. In particular, the storing module 825 may be configured to store the measurement message.

The processing module 820 may be further coupled to a routing module 830. The processing module 820 may pass the measurement message to the routing module 830 for additional processing. The routing module 830 may analyze the measurement message to determine one or more destinations based, at least in part on the content of the measurement message. For example, the measurement message may contain a PN offset of the femto node 210. The routing module 830 may analyze the PN offset and determine that the femto node 210 is associated with the FCS 254. The routing module 830 may be directly coupled to the storing module 825 to facilitate routing decisions. For example, the storing module 825 may store a data structure, e.g., a list or table, containing information associating PN offset values with addresses or other identifiers for FCSs. The routing module 830 may be configured to look up the identifiers for an FCS in the storing module 825 using the PN offset. The routing module 830 may also be configured to provide information to the processing module 820 such as an address or other identifier for the FCS 254 to which the measurement message should be sent. The processing module 820 may be configured to use this information from the routing module 830 to forward the measurement message to the FCS 254. The processing module 820 may pass the outbound message to the network interface 810 for transmission to the FCS 254.

The network interface 810 may comprise a modem. The modem may be configured to modulate/demodulate the outbound/inbound messages. The network interface 810 may demodulate the data received according. The demodulated data may be transmitted to the processing module 820. The network interface 810 may modulate data to be sent from the MSC 252. Data to be sent may be received from the processing module 820.

The storing module 825 may comprise processor cache, including a multi-level hierarchical cache in which different levels have different capacities and access speeds. The storing module 825 may also comprise random access storing module (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the MSC 252 need not be separate structural elements. For example, the processing module 820 and the memory 825 may be embodied in a single chip. The processing module 820 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the MSC 252, such as processing module 820 and routing module 830 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the MSC 252 may also be implemented as a combination of computing devices, e.g., a combination of a DSP and a microprocessor, a plurality of microprocessors, one or more microprocessors in conjunction with a DSP communication, or any other such configuration.

Figure 9:
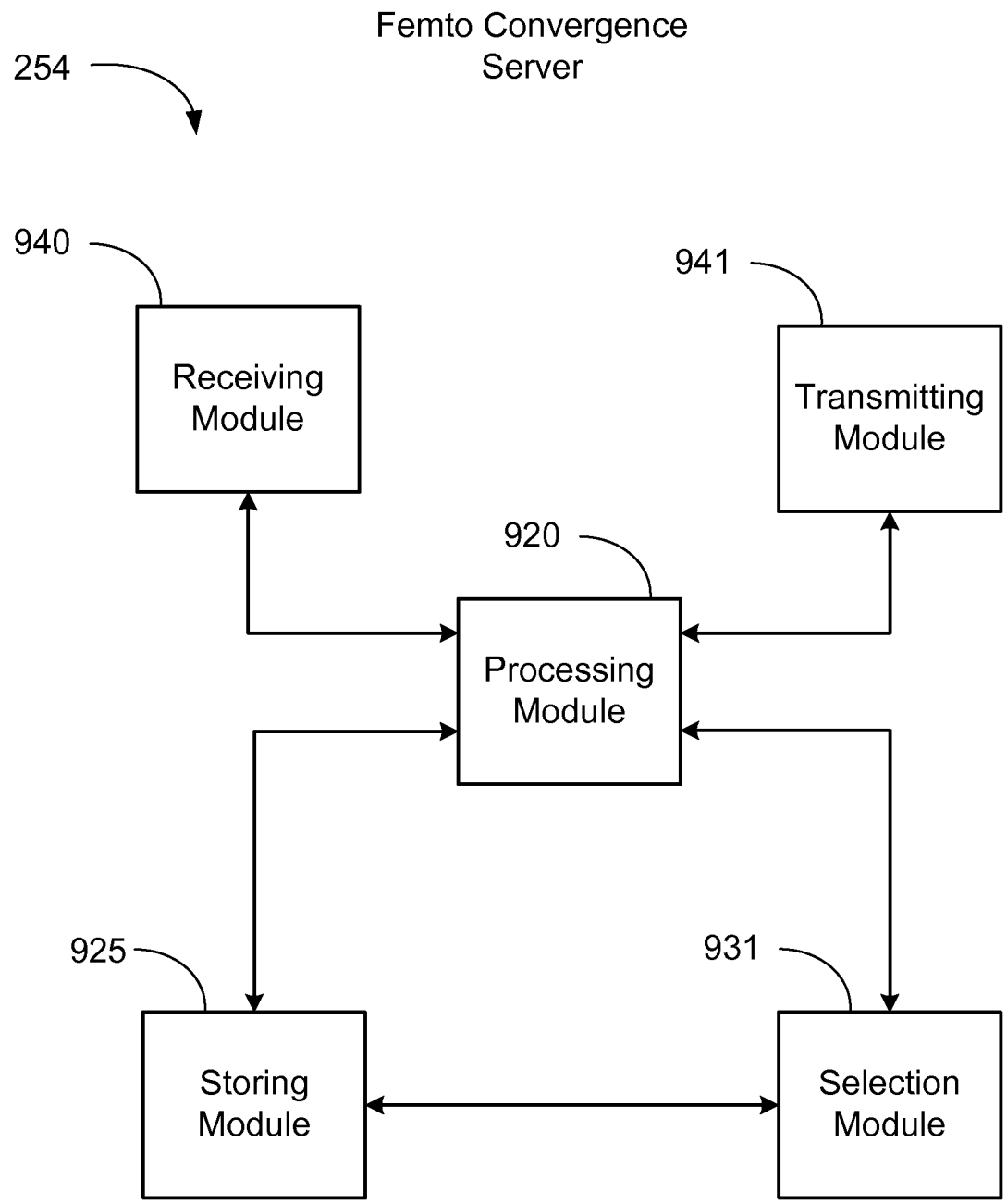
FIG. 9 is a functional block diagram of an exemplary femto convergence server (FCS) shown in FIG. 2.

FIG. 9 is a functional block diagram of an exemplary femto convergence server (FCS) 254 shown in FIG. 2. As described above with respect to FIG. 2, the FCS 254 operates as a femto switch configured to route messages between the MSC 252 and the femto nodes 210 and 212 via the network 240. In addition, the FCS 254 may be configured to help identify hand in targets such as the femto node 210 based on RL and/or FL measurement information as discussed above in FIG. 2. The FCS 254 may comprise a receiving module 940 configured to receive a measurement message from the AT 222 via the macro node 205 and the MSC 252. The FCS 254 may also comprise transmitting module 941 to transmit a measurement request to the femto nodes 210 and 212 via the network 240. The receiving module 940 and the transmitting module 941 may be coupled to a processing module 920. The processing module 920 may be configured to process the inbound and outbound messages. The processing module 920 may further be coupled, via one or more buses, to a storing module 925. The processing module 920 may read information from or write information to the storing module 925. The storing module 925 may be configured to store the inbound and outbound messages before, during, or after processing. In particular, the storing module 925 may be configured to store the measurement request and the measurement message discussed above.

The processing module 920 may analyze the measurement message to determine a PN offset for a femto node. For example, the measurement message may comprise a PN offset of 50. The processing module 920 may analyze the PN offset in the measurement message to determine if the AT 222 has access to the femto nodes having the PN office of 50 (e.g., femto node 210). The AT 222 may have access to the femto node 210 if the femto node 210 is an open node and/or if the AT 222 is a member of an access list for the femto node 210. As discussed above in FIG. 8, the MSC 252 may add an identifier for the macro node 205 in the measurement message and/or the MSC 252 may transmit a separate message with the identifier for the macro node 205. The processing module 920 may obtain the identifier for the macro node 205 (e.g., a scrambling code). The processing module 920 may use the identifier for the macro node 205 and the PN offset of 50 to obtain a list of all femto nodes in a certain area around the macro node 205 which use a PN offset of 50. For example, the processing module 920 may determine that there are a total of six femto nodes within a 200 foot radius the macro node 205 which use a PN offset of 50. The processing module 920 may include the six femto nodes in the list of femto nodes. In another example, the processing module 920 may determine that there are a total of twenty femto nodes within a mile radius the macro node 205 which use a PN offset of 50. The processing module 920 may include the twenty femto nodes in the list of femto nodes. A variety of different areas, sizes, and shapes around the macro node 205 may be used when obtaining the list of femto nodes in a certain area around the macro node 205.

The processing module 920 may also generate measurement requests and send the measurement requests to all the femto nodes in the list of femto nodes. The femto nodes which receive the measurement request (e.g., femto nodes 210 and 212) may perform RL and/or FL measurements after receiving the measurement requests, as discussed above in FIGS. 2 and 6. The femto nodes may send measurement reports to the FCS 254 after performing RL and/or FL measurements. The processing module 920 may obtain the measurement reports from the receiving module 940 and/or the processing module 920. In one embodiment, the processing module 920 may store the measurement reports in the storing module 925. In another embodiment, the processing module 920 may pass the measurement reports directly to a selection module 931.

The selection module 931 may analyze all of the measurement reports received from the different femto nodes with a PN offset of 50 (e.g., femto nodes 210 and 212). For each measurement report received from each femto node, the selection module 931 may analyze the power of the pilot signal transmitted by femto node (e.g., $TxPilPwr_{femto1}$) and the amount of pilot energy that the femto node receives on the RL from the AT 222 (e.g., $E_{cp,\ @\ femto1}$). The selection module 931 may combine the values received for each femto node and rank the combined values for each femto node. For example, the selection module 931 may add $TxPilPwr_{femto1}$ and $E_{cp,\ @\ femto1}$ for the femto node 210, and may add $TxPilPwr_{femto2}$ and $E_{cp,\ @\ femto2}$ for the femto node 212. The selection module 931 may rank the combined values in a certain order (e.g., largest to smallest or smallest to largest). The selection module 931 may select the femto node with the largest combined value as the hand in target (e.g., femto node 210), as discussed above in FIG. 2. The processing module 920 may generate a handover message and send the handover message to the AT 222 via the macro node 205 and/or to the femto node 210 to facilitate the hand in of the AT 222 from the macro node 205 to the femto node 210. The processing module 920 may use the transmitting module 941 to send the handover message to the AT 222 and/or the femto node 210. The handover message may comprise at least a designated time for the hand in to occur and an identifier for the AT that will hand in (e.g., an IMSI for AT 222).

The receiving module 940 and the transmitting module 941 may comprise a modem. The modem may be configured to modulate/demodulate the outbound/inbound messages going to or coming from the FCS 254. The receiving module 940 may demodulate the data received. The demodulated data may be transmitted to the processing module 920. The transmitting module 941 may modulate data to be sent from the MSC 252. Data to be sent may be received from the processing module 920.

The storing module 925 may comprise processor cache, including a multi-level hierarchical cache in which different levels have different capacities and access speeds. The storing module 925 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives Although described separately, it is to be appreciated that functional blocks described with respect to the FCS 254 need not be separate structural elements. For example, the processing module 920 and the storing module 925 may be embodied in a single chip. The processing module 920 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the FCS 254, such as the processing module 920 and the selection module 931 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the FCS 254 may also be implemented as a combination of computing devices, e.g., a combination of a DSP and a microprocessor, a plurality of microprocessors, one or more microprocessors in conjunction with a DSP communication, or any other such configuration.

Although the above-embodiments discuss femto nodes, other embodiments of the invention may be applicable to any type of node (e.g., macro nodes, Node Bs, etc.)

The functionality described herein (e.g., with regard to one or more of the accompanying figures) may correspond in some aspects to similarly designated "means for" functionality in the appended claims. Referring to FIGS. 5 through 9, the femto node 210, the AT 222, the macro node 205, the MSC 252, and the FCS 254 are represented as a series of interrelated functional modules.

The functionality of the modules of FIGS. 5 through 9 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

Figure 10:
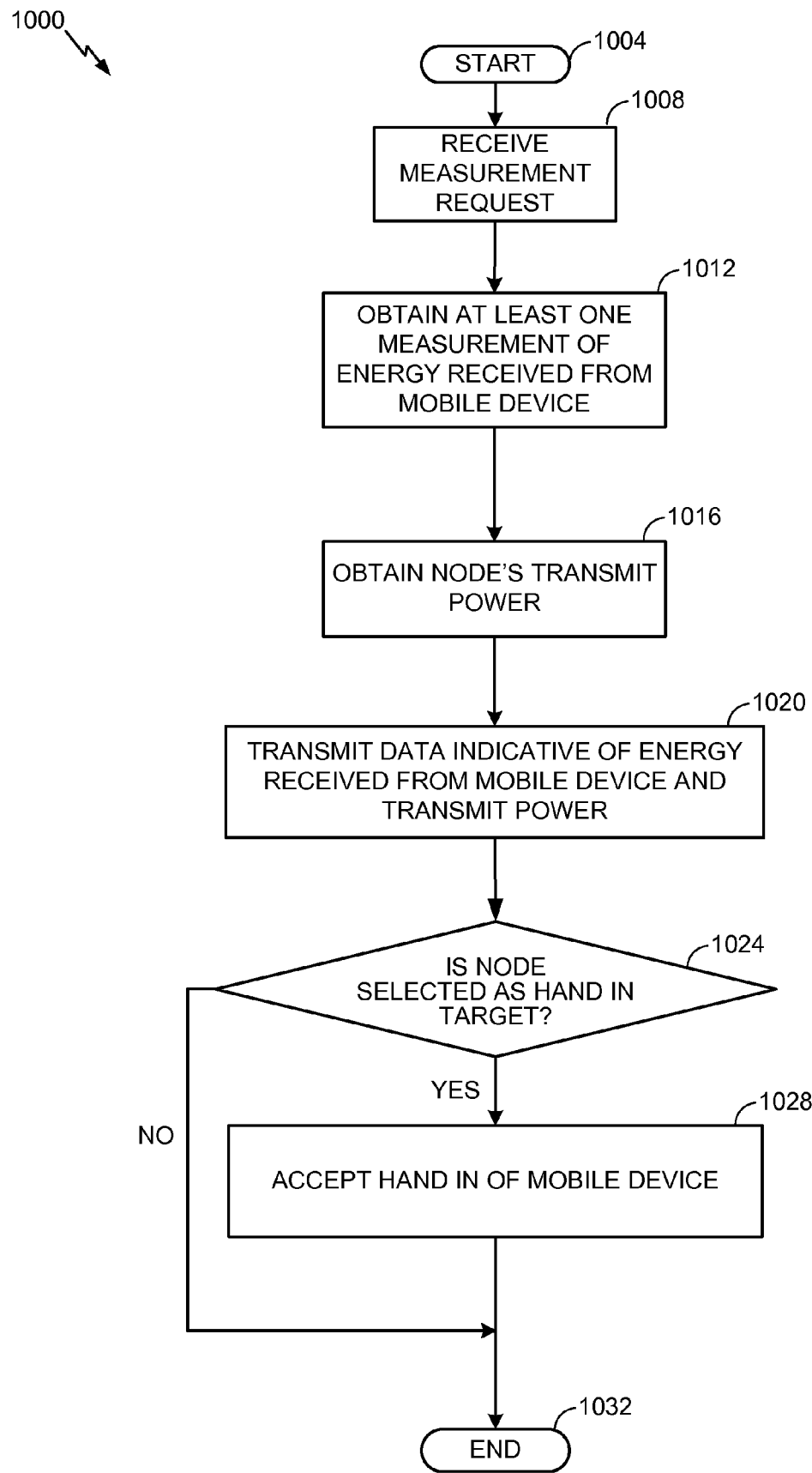
FIG. 10 is a flow chart illustrating a first exemplary communication process which may be performed by the femto node shown in FIG. 6.

FIG. 10 is a flow chart illustrating a first exemplary communication process 1000 which may be performed by the femto node 210 shown in FIG. 6. The process 1000 may be performed by the femto node 210 when the femto node 210 receives a measurement request from the FCS 254. The process 1000 begins at start bock 1004 and ends at end block 1032. Reference may be made to FIGS. 2, 5, and 6 in the description of FIG. 10. In one embodiment, parts of the process 1300 may be performed by at least one of the processing module 605 and the measuring module 620 of the femto node 210 shown in FIG. 6. The process 1000 may be performed each time the femto node 210 receives a measurement request from the FCS 254.

The process 1000 starts at start block 1004 and moves to block 1008, where the femto node 210 receives a measurement request. The femto node 210 may use the receiving module 630 to receive the measurement request and may process the measuring request using at least one of the processing module 605 and the measuring module 620. As discussed in FIG. 6, the measurement request may comprise an identifier for an AT, such as AT 222 shown in FIG. 2. After processing the measurement request, the process 1000 moves onto block 1012, where the measuring module 620 may obtain at least one measurement of an RL between the AT (e.g., AT 222) and the femto node 210, as discussed above in FIG. 2. The measuring module 620 may use the receiving module 630 to obtain the at least one measurement. For example, the receiving module 630 may perform the at least one measurement and provide data indicative of the at least one measurement to the measuring module 620. After obtaining the at least one measurement, the process 1000 moves onto block 1016, where the measuring module 620 obtains the transmit pilot power of the femto node 210, as discussed above in FIG. 2. The measuring module 620 may use the transmitting module 631 to obtain the transmit power of the femto node 210. For example, the measuring module 620 may query the transmitting module 631 to determine the transmit power of the femto node 210.

After obtaining the transmit power, the process 1000 moves to block 1020, where the measuring module 620 may generate a measurement report, as discussed above in FIGS. 2 and 6 The measurement report may comprise data indicative of the pilot energy received from the AT 222 and the transmit pilot power of the femto node 212. The measuring module may use the transmitting module 631 to transmit the measurement report to the FCS 254 via the network 240. After transmitting the measurement report, the process 1000 moves to block 1024, where the measuring module 620 determines if the femto node 210 is selected as a hand in target for the AT 222. The measuring module 620 may make this determination by waiting for a handover message to arrive via the receiving module 630, as described in FIGS. 6 and 9. If a handover message does not arrive, the process 1000 moves to the end block 1032, where the process 1000 ends. If a handover message is received, the process 1000 moves to block 1028, where the femto node 212 accepts the hand in of the mobile device (e.g., AT 222). After accepting hand in of the mobile device, the process 1000 moves to end block 1032, where the process 1000 ends.

Figure 11:
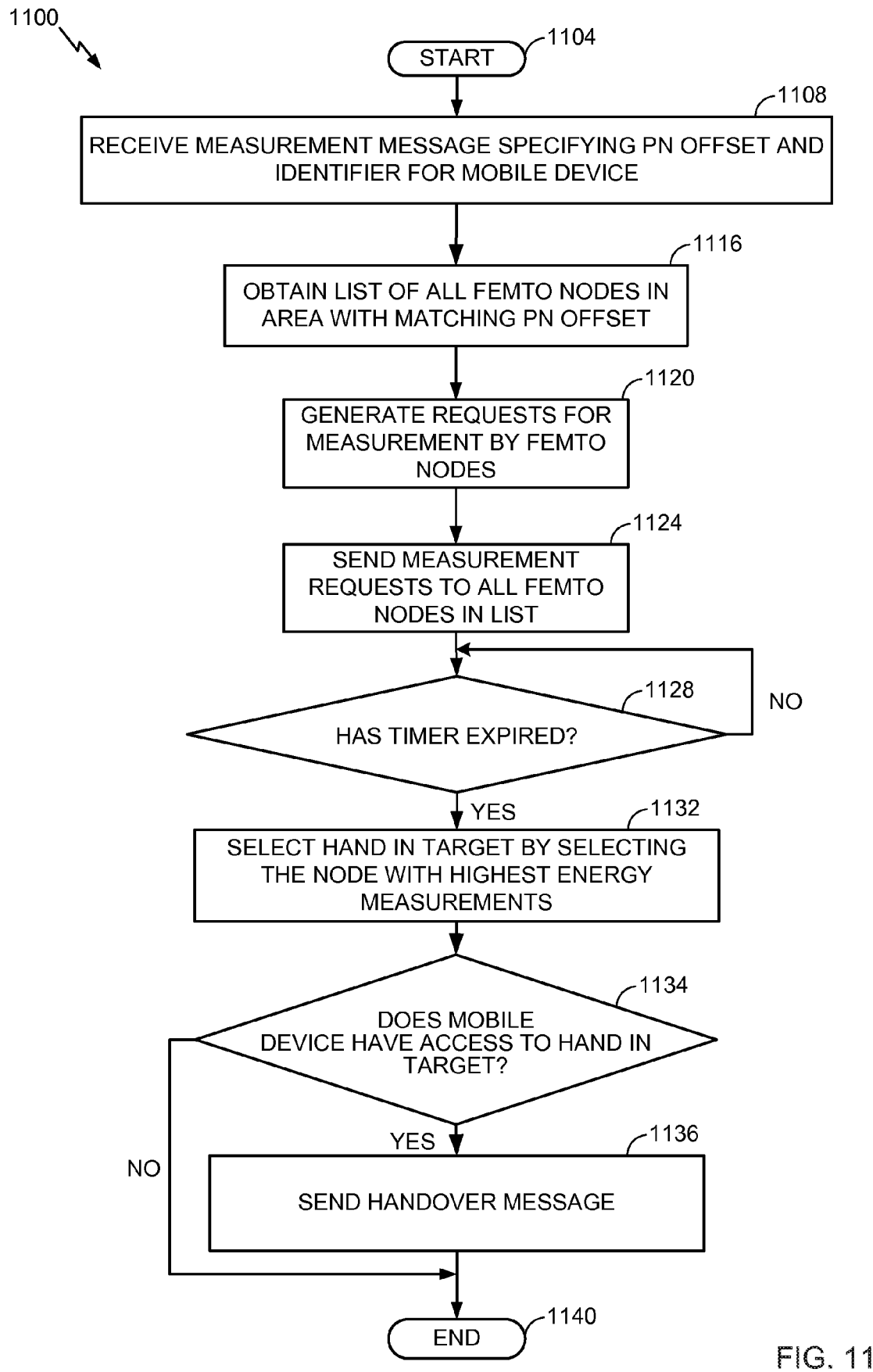
FIG. 11 is a flow chart illustrating a second exemplary communication process which may be performed by the femto convergence server (FCS) shown in FIG. 9.

FIG. 11 is a flow chart illustrating a second exemplary communication process 1100 which may be performed by the femto convergence server (FCS) 254 shown in FIG. 9. The process 1200 may be performed by the FCS 254 when the FCS 254 receives a measurement message from the AT 222 via the macro node 205. The process 1100 begins at start bock 1104 and ends at end block 1040. Reference may be made to FIGS. 2, 5, 6, and 9 in the description of FIG. 11. In one embodiment, parts of the process 1100 may be performed by at least one of the processing module 920 and the selection module 931 of the FCS 254 shown in FIG. 9. The process 1100 may be performed each time the FCS 254 receives a measurement message from the AT 222.

The process 1100 begins at start block 1104 and moves to block 1108, where the receiving module 940 receives a measurement message from the AT 222 via the macro node 205. The receiving module may pass the measurement message to the processing module 920. The measurement message may also be passed to the processing module 920 and may be stored in the storing module 925. The measurement message may comprise at least a PN offset for a target femto node (e.g., femto node 210) and an identifier for a mobile device (e.g., an IMSI for AT 222). After receiving the measurement message, the process 1100 moves to block 1116, where the processing module 920 obtains a list of all femto nodes in a certain area which use the specified PN offset. As discussed above in FIG. 9, the processing module 920 may use the identifier for the macro node 205 and the specified PN offset of to obtain a list of all femto nodes in a certain area around the macro node 205 which use the specified PN offset.

After obtaining the list of all femto nodes in a certain area which use the specified PN offset, the process moves to block 1120 where the processing module 920 may generate measurement requests for measurement by the femto nodes in the list of femto nodes. In one embodiment, the processing module 920 may only generate one measurement request. In another embodiment, the processing module 920 may generate multiple measurement requests. After generating at least one measurement request, the process moves to block 1124, wherein the transmitting module is 941 may be used to send the at least one measurement request to all the femto nodes in the list of femto nodes. After sending the at least one measurement request to all of the femto nodes in the list of femto nodes, the process 1100 moves to block 1128 where the selecting module 931 may determine if a timer for waiting for data from the femto nodes has expired. The selecting module 931 may wait for a specified period of time (e.g., the timer) for data to be received from the femto nodes in the list of femto nodes. If the timer has not expired, the process 1100 loops back to block 1128 where the process 1100 waits for more data from the femto nodes. For example, the FCS 254 may only wait for 5 seconds to check if the data has been received. In another example, the FCS 254 may only wait 10 seconds to check if the data has been received. If the timer has expired, the process 1100 moves to block 1132, where the selection module 931 may select a hand in target by selecting the node with the highest energy measurements, as discussed above in FIG. 2. The selection module 931 may select a hand in target femto node based on the values in the reports, as discussed above in FIG. 2. After selecting the hand in target femto node, the process moves to block 1134, where at least one of the processing module 920 and the processing module 920 may be used to determine if the mobile device (e.g., AT 222) has access to the hand in target (e.g., femto node 210). As discussed above in FIG. 2, an AT 222 may have access to a femto node if the femto node is an open node and/or the AT 222 is a member of an access control list of the femto node. If the AT 222 does not have access to the hand in target (e.g., femto node 210), the process 1100 moves to the end block 1140 where the process 1100 ends. If the AT 222 does have access to the hand in target, the process moves to block 1136, where the selection module 941 uses the transmit module 941 to send a handover message to the AT 222 and/or the femto node 210. Based on, at least in part, the handover message sent by the FCS 254, the AT 222 may establish a communication link (RL and DL) with the femto node 210. The process 1100 then moves to end block 1140, where the process 1100 ends.

Figure 12:
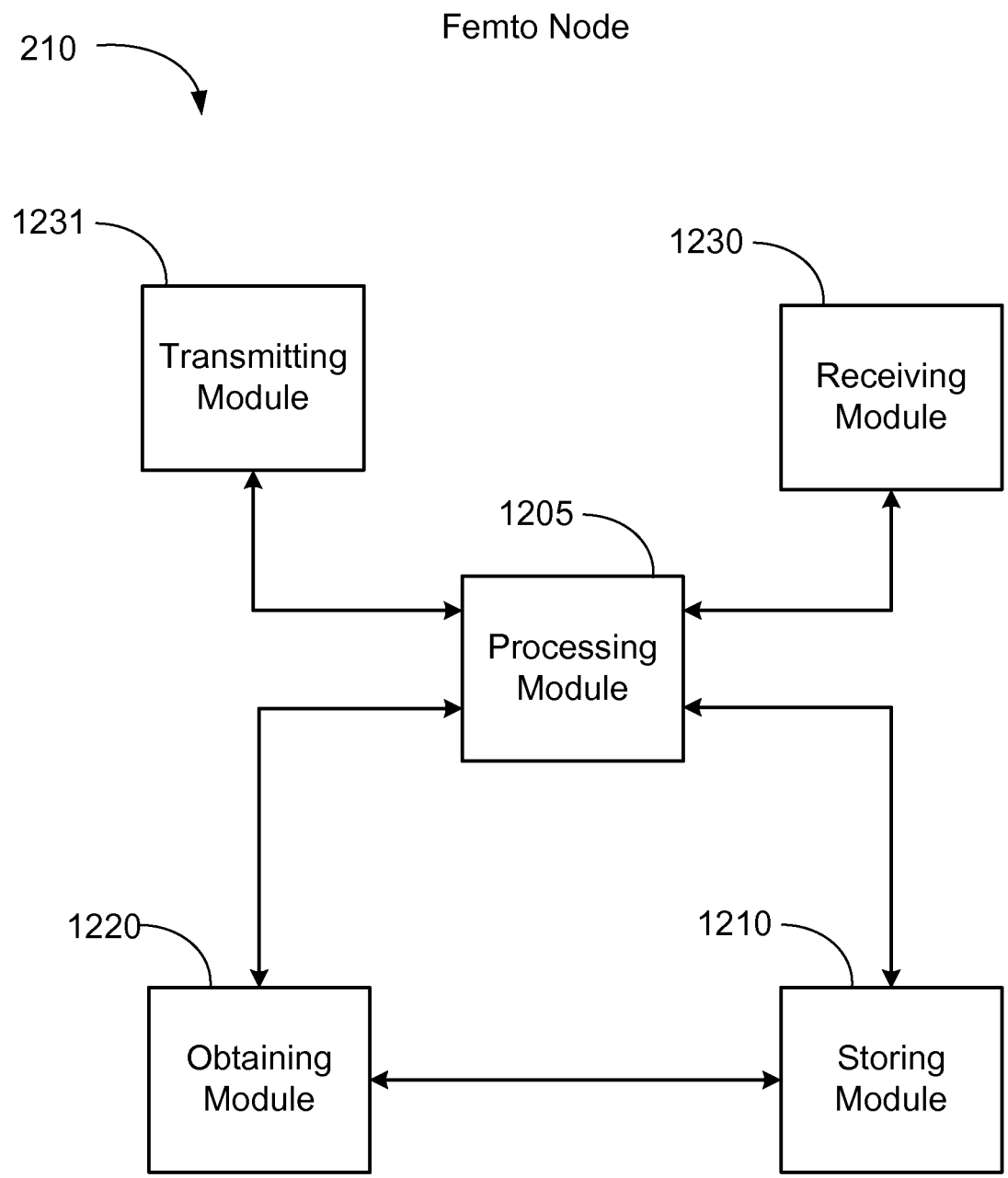
FIG. 12 is a functional block diagram of a third exemplary femto node of one of the communication networks of FIG. 2.

FIG. 12 is a functional block diagram of a third exemplary femto node of one of the communication networks of FIG. 2. As shown, the femto node 210 may comprise a processing module 1205, a storing module 1210, an obtaining module 1220, a receiving module 1230, and a transmitting module 1231. The processing module 1205 is coupled to the storing module 1210, the obtaining module 1220, the receiving module 1230, and the transmitting module 1231. The obtaining module 1220 is coupled to the storing module 1210. The processing module 1205 may correspond at least in some aspects to, for example, a processor as discussed herein. The storing module 1210 may correspond at least in some aspects to, for example, a memory as discussed herein. The receiving module 1230 may correspond at least in some aspects to, for example, a transceiver and/or an antenna as discussed herein. The transmitting module 1231 may correspond at least in some aspects to, for example, a transceiver and/or an antenna as discussed herein. The obtaining module 1220 may correspond at least in some aspects to, for example, the measuring module 620 shown in FIG. 6, as discussed herein.

Figure 13:
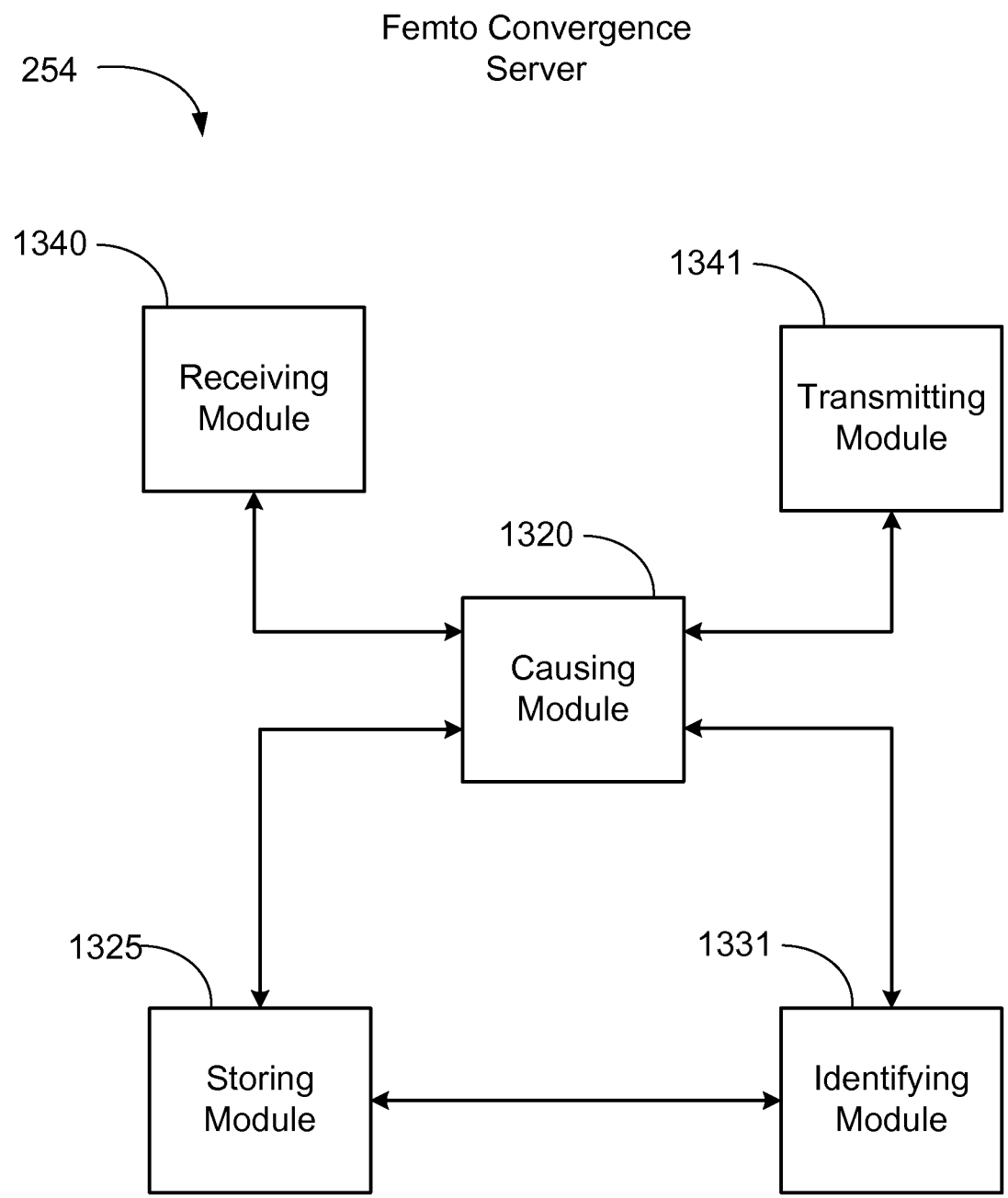
FIG. 13 is a functional block diagram of a second femto convergence server (FCS) of one of the communication networks of FIG. 2.

FIG. 13 is a functional block diagram of a second femto convergence server (FCS) of one of the communication networks of FIG. 2. As shown, the FCS 254 may comprise a causing module 1305, a storing module 1325, an identifying module 1331, a receiving module 1340, and a transmitting module 1341. The causing module 1305 is couple to the storing module 1325, the identifying module 1331, the receiving module 1340, and the transmitting module 1342. The identifying module 1331 is coupled to the storing module 1325. The causing module 1305 may correspond at least in some aspects to, for example, a processor as discussed herein. The storing module 1325 may correspond at least in some aspects to, for example, a memory as discussed herein. The receiving module 1340 may correspond at least in some aspects to, for example, a transceiver and/or an antenna as discussed herein. The transmitting module 1341 may correspond at least in some aspects to, for example, a transceiver and/or an antenna as discussed herein. The identifying module 1331 may correspond at least in some aspects to, for example, the selection module 931 shown in FIG. 9, as discussed herein.

The functionality of the modules of FIGS. 12-13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

The functionality described herein (e.g., with regard to one or more of the accompanying figures) may correspond in some aspects to similarly designated "means for" functionality in the appended claims. Referring to FIGS. 12-13, the femto node 210 and the FCS 254 are represented as a series of interrelated functional modules.

The functionality of the modules of FIGS. 12-13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, a connection may be used to transmit and/or receive computer-readable medium. For example, the software may be transmitted from a website, server, or other remote source using a coaxial cable, fiber optic cable, twisted pair, digital subscriber line (DSL), or wireless technologies such as infrared, radio, and microwave. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A device operable in a wireless communication system, the device comprising:
    a receiver configured to receive from each of a plurality of communication nodes respective first data indicative of a power level of a signal received by one of the plurality of communication nodes from a wireless communication device, and second data indicative of a transmit power of a beacon signal transmitted by the one of the plurality of communication nodes, wherein the transmit power of the beacon signal is measured by the one of the plurality of communication nodes;
    a selection module configured to identify a target communication node from the plurality of communication nodes based at least in part on the first data indicative of the power level of the signal received by the one of the plurality of communication nodes, and the second data indicative of the transmit power of the beacon signal transmitted by the one of the plurality of communication nodes; and
    a processor configured to cause the wireless communication device to establish a communication channel with the target communication node.

2. The device of claim 1, wherein the selection module identifies the target communication node from the plurality of communication nodes by identifying a communication node from the plurality of communication nodes with a highest sum of the power level of the signal received by the one of the plurality of communication nodes and the transmit power of the beacon signal transmitted by the one of the plurality of communication nodes.

3. The device of claim 1, wherein the processor is further configured to provide third data indicative of a termination time to at least one of a first communication node and the wireless communication device, wherein a second communication channel between the wireless communication device and the first communication node is terminated at the termination time, and to provide fourth data indicative of a start time to at least one of the target communication node and the wireless communication device, wherein the communication channel between the wireless communication device and the target communication node is established at the start time.

4. The device of claim 3, wherein the wireless communication device comprises at least one of a cell phone, a personal digital assistant (PDA), a smartphone, and a wireless card, wherein each of the plurality of communication nodes comprises at least one of a pico node and a femto node, and wherein the first communication node comprises at least one of a NodeB, a base station, a cell tower, and a macro node.

5. The device of claim 1, wherein the beacon signal transmitted by one of the plurality of communication nodes comprises a predetermined signal for determining signal quality and an identifier.

6. The device of claim 1, wherein the respective data for each of the plurality of communication nodes is received in response to a request transmitted to each of the plurality of communication nodes, wherein the request causes each of the plurality of communication nodes to transmit the respective data.

7. The device of claim 6, wherein the request comprises data indicative of at least one of a time duration, and periodic interval, for performing at least one measurement by at least one of the plurality of communication nodes.

8. The device of claim 1, wherein each of the plurality of communication nodes broadcasts a substantially identical identifier.

9. The device of claim 1, wherein the selection module is further configured to determine if the wireless communication device has access to the plurality of communication nodes.

10. The device of claim 1, wherein the beacon signal transmitted by the one of the plurality of communication nodes is transmitted over a beacon channel.

11. The device of claim 1, wherein the respective data received from each of the plurality of communication nodes comprises third data indicative of at least one of a time, duration, and periodic interval of at least one measurement performed by at least one of the plurality of communication nodes.

12. The device of claim 11, wherein the selection module is further configured to identify the target communication node from the plurality of communication nodes based at least in part on the third data indicative of at least one of a time, duration, and periodic interval.

13. The device of claim 1, wherein the respective data for each of the plurality of communication nodes is received in response to a request transmitted to each of the plurality of communication nodes, and wherein the request comprises data informing each of the plurality of communication nodes of a common time at which each of the plurality of communication nodes are to measure at least one of the power level of the signal and the transmit power of the beacon signal.

14. A method of communication comprising:
receiving from each of a plurality of communication nodes respective first data indicative of a power level of a signal received by one of the plurality of communication nodes from a wireless communication device, and second data indicative of a transmit power of a beacon signal transmitted by the one of the plurality of communication nodes, wherein the transmit power of the beacon signal is measured by the one of the plurality of communication nodes;
identifying a target communication node from the plurality of communication nodes based at least in part on the first data indicative of the power level of the signal received by the one of the plurality of communication nodes, and the second data indicative of the transmit power of the beacon signal transmitted by the one of the plurality of communication nodes; and
causing the wireless communication device to establish a communication channel with the target communication node.

15. The method of claim 14, wherein identifying the target communication node comprises identifying a communication node from the plurality of communication nodes with a highest sum of the power level of the signal received by the one of the plurality of communication nodes and the transmit power of the beacon signal transmitted by the one of the plurality of communication nodes.

16. The method of claim 14, further comprising providing third data indicative of a termination time to the at least one of a first communication node and the wireless communication device, wherein a second communication channel between the wireless communication device and the first communication node is terminated at the termination time, and by providing fourth data indicative of a start time to at least one of the target communication node and the wireless communication device, wherein the communication channel between the wireless communication device and the target communication node is established at the start time.

17. The method of claim 16, wherein the wireless communication device comprises at least one of a cell phone, a personal digital assistant (PDA), a smartphone, and a wireless card, wherein each of the plurality of communication nodes comprises at least one of a pico node and a femto node, and wherein the first communication node comprises at least one of a NodeB, a base station, a cell tower, and a macro node.

18. The method of claim 14, wherein the beacon signal transmitted by one of the plurality of communication nodes comprises a predetermined signal for determining signal quality and an identifier.

19. The method of claim 14, wherein the respective data for each of the plurality of communication nodes is received in response to a request transmitted to each of the plurality of communication nodes, wherein the request causes each of the plurality of communication nodes to transmit the respective data.

20. The method of claim 19, wherein the request comprises data indicative of at least one of a time, duration, and periodic interval, for performing at least one measurement by at least one of the plurality of communication nodes.

21. The method of claim 14, wherein each of the plurality of communication nodes broadcasts a substantially identical identifier.

22. The method of claim 14, further comprising determining if the wireless communication device has access to the plurality of communication nodes.

23. The method of claim 14, wherein the beacon signal transmitted by the one of the plurality of communication nodes is transmitted over at least one of a first channel and a beacon channel.

24. The method of claim 14, wherein the respective data received from each of the plurality of communication nodes comprises third data indicative of at least one of a time, duration, and periodic interval of at least one measurement performed by at least one of the plurality of communication nodes.

25. The method of claim 24, further comprising identifying the target communication node based at least in part on the third data indicative of at least one of a time, duration, and periodic interval.

26. The method of claim 14, wherein the respective data for each of the plurality of communication nodes is received in response to a request transmitted to each of the plurality of communication nodes, and wherein the request comprises data informing each of the plurality of communication nodes of a common time at which each of the plurality of communication nodes are to measure at least one of the power level of the signal and the transmit power of the beacon signal.

27. A device operable in a wireless communication system, the device comprising:
means for receiving from each of a plurality of communication nodes respective first data indicative of a power level of a signal received by one of the plurality of communication nodes from a wireless communication device, and second data indicative of a transmit power of a beacon signal transmitted by the one of the plurality of communication nodes, wherein the transmit power of the beacon signal is measured by the one of the plurality of communication nodes;
means for identifying a target communication node from the plurality of communication nodes based at least in part on the first data indicative of the power level of the signal received by the one of the plurality of communication nodes, and the second data indicative of the transmit power of the beacon signal transmitted by the one of the plurality of communication nodes; and
means for causing the wireless communication device to establish a communication channel with the target communication node.

28. The device of claim 27, wherein the means for identifying identifies the target communication node from the plurality of communication nodes by identifying a communication node from the plurality of communication nodes with a highest sum of the power level of the signal received by the one of the plurality of communication nodes and the transmit power of the beacon signal transmitted by the one of the plurality of communication nodes.

29. The device of claim 27, wherein the respective data received from each of the plurality of communication nodes comprises third data indicative of at least one of a time, duration, and periodic interval of at least one measurement performed by at least one of the plurality of communication nodes.

30. The device of claim 27, wherein the means for causing is further configured to provide third data indicative of a termination time to at least one of a first communication node and the wireless communication device, wherein a second communication channel between the wireless communication device and the first communication node is terminated at the termination time, and to provide fourth data indicative of a start time to at least one of the target communication node and the wireless communication device, wherein the communication channel between the wireless communication device and the target communication node is established at the start time.

31. The device of claim 30, wherein the wireless communication device comprises at least one of a cell phone, a personal digital assistant (PDA), a smartphone, and a wireless card, wherein each of the plurality of communication nodes comprises at least one of a pico node and a femto node, and wherein the first communication node comprises at least one of a NodeB, a base station, a cell tower, and a macro node.

32. A computer program product, comprising:
a non-transitory computer-readable medium comprising:
code for causing a computer to receive from each of a plurality of communication nodes respective first data indicative of a power level of a signal received by one of the plurality of communication nodes from a wireless communication device, and second data indicative of a transmit power of a beacon signal transmitted by the one of the plurality of communication nodes, wherein the transmit power of the beacon signal is measured by the one of the plurality of communication nodes;
code for causing a computer to identify a target communication node from the plurality of communication nodes based at least in part on the first data indicative of the power level of the signal received by the one of the plurality of communication nodes, and the second data indicative of the transmit power of the beacon signal transmitted by the one of the plurality of communication nodes; and
code for causing a computer to cause the wireless communication device to establish a communication channel with the target communication node.

33. The computer program product of claim 32, further comprising code for causing a computer to identify the target communication node from the plurality of communication nodes by identifying a communication node from the plurality of communication nodes with a highest sum of the power level of the signal received by and the transmit power of the beacon signal transmitted by the one of the plurality of communication nodes.

34. The computer program product of claim 32, wherein the respective data received from each of the plurality of communication nodes comprises third data indicative of at least one of a time, duration, and periodic interval of at least one measurement performed by at least one of the plurality of communication nodes.

35. The computer program product of claim 32, further comprising code for causing a computer to provide third data indicative of a termination time to at least one of a first communication node and the wireless communication device, wherein a second communication channel between the wireless communication device and the first communication node is terminated at the termination time, and to provide fourth data indicative of a start time to at least one of the target communication node and the wireless communication device, wherein the communication channel between the wireless communication device and the target communication node is established at the start time.

36. The computer program product of claim 35, wherein the wireless communication device comprises at least one of a cell phone, a personal digital assistant (FDA), a smartphone, and a wireless card, wherein each of the plurality of communication nodes comprises at least one of a pico node and a femto node, and wherein the first communication node comprises at least one of a NodeB, a base station, a cell tower, and a macro node.

37. A device operable in a wireless communication system, the device comprising:
a receiver configured to receive a signal from a wireless communication device;
a transmitter configured to transmit a beacon signal to the wireless communication device;
a measuring module configured to obtain from the receiver a power level of the signal received from the wireless communication device, and obtain from the transmitter a transmit power of the beacon signal transmitted to the wireless communication device; and
wherein the transmitter is further configured to transmit to a communication server, first data indicative of the power level of the signal received from the wireless communication device, and second data indicative of the transmit power of the beacon signal.

38. The device of claim 37, wherein the beacon signal is transmitted over a beacon channel.

39. The device of claim 37, wherein the receiver is further configured to receive at least one of a time, duration, and periodic interval, for obtaining the power level of the signal and the transmit power of the beacon signal, by the measuring module.

40. The device of claim 37, wherein the measuring module is further configured to obtain the power level of the signal and the transmit power of the beacon signal during at least one of a time, duration, and periodic interval.

41. The device of claim 37, wherein the transmitter is further configured to transmit third data indicative of at least one of a time, duration, and periodic interval in which the measuring module obtained the power level of the signal and the transmit power of the beacon signal.

42. The device of claim 37, wherein the receiver is further configured to receive a message from the communication server and wherein at least one of the receiver and the transmitter is further configured to establish a communication channel with the wireless communication device based at least in part on the message.

43. The device of claim 37, further comprising a receiver configured to receive a request transmitted to each of a plurality of communication nodes, wherein the request comprises data informing each of the plurality of communication nodes of a common time at which each of the plurality of communication nodes are to measure at least one of the power level of the signal and the transmit power of the beacon signal.

44. A method of communication comprising:
receiving a signal from a wireless communication device;
transmitting a beacon signal to the wireless communication device;
obtaining from a receiver a power level of the signal received from the wireless communication device;
obtaining from a transmitter a transmit power of the beacon signal transmitted to the wireless communication device; and
transmitting first data indicative of the power level of the signal received from the wireless communication device, and second data indicative of the transmit power of the beacon signal to a communication server.

45. The method of claim 44, wherein the beacon signal is transmitted over a beacon channel.

46. The method of claim 44, further comprising receiving data indicative of at least one of a time, duration, and periodic interval, for obtaining the power level of the signal and the transmit power of the beacon signal.

47. The method of claim 44, further comprising obtaining the first data indicative of the power level of the signal received from the wireless communication device, and the second data indicative of the transmit power of the beacon signal during at least one of a time, duration, and periodic interval.

48. The method of claim 44, further comprising transmitting third data indicative of at least one of a time, duration, and periodic interval in which the first data indicative of the power level of the signal received from the wireless communication device, and the second data indicative of the transmit power of the beacon signal were obtained.

49. The method of claim 44, further comprising receiving a message from the communication server establishing a communication channel with the wireless communication device based at least in part on the message.

50. The method of claim 44, further comprising receiving a request transmitted to each of a plurality of communication nodes, wherein the request comprises data informing each of the plurality of communication nodes of a common time at which each of the plurality of communication nodes are to measure at least one of the power level of the signal and the transmit power of the beacon signal.

51. A device operable in a wireless communication system, the device comprising:
means for receiving a signal from a wireless communication device;
means for transmitting a beacon signal to the wireless communication device;
means for obtaining, from the means for receiving, a power level of a signal received from the wireless communication device;
means for obtaining, from the means for transmitting, a transmit power of the beacon signal transmitted to the wireless communication device; and
wherein the means for transmitting is further configured to transmit first data indicative of the power level of the signal received from the wireless communication device, and second data indicative of the transmit power of the beacon signal.

52. The device of claim 51, wherein the beacon signal is transmitted over a beacon channel.

53. The device of claim 51, wherein the means for receiving is further configured to receive data indicative of at least one of a time, duration, and periodic interval, for obtaining the power level of the signal and the transmit power of the beacon signal.

54. The device of claim 51, wherein the means for obtaining is further configured to obtain the first data indicative of the power level of the signal received from the wireless communication device, and the second data indicative of the transmit power of the beacon signal during at least one of a time, duration, and periodic interval.

55. The device of claim 51, wherein the means for transmitting is further configured to transmit third data indicative of at least one of a time, duration, and periodic interval in which the first data indicative of the power level of the signal received from the wireless communication device, and the second data indicative of the transmit power of the beacon signal were obtained.

56. The device of claim 51, wherein the means for receiving is further configured to receive a message from the communication server and at least one of the means for transmitting and the means for receiving is configured to establish a communication channel with the wireless communication device based at least in part on the message.

57. A computer program product, comprising:
a non-transitory computer-readable medium comprising:
code for causing a computer to receive a signal from a wireless communication device;
code for causing a computer to transmit a beacon signal to the wireless communication device;
code for causing a computer to obtain from a receiver a power level of a signal received from the wireless communication device;
code for causing a computer to obtain from a transmitter a transmit power of the beacon signal transmitted to the wireless communication device; and
code for causing a computer to transmit first data indicative of the power level of the signal received from the wireless communication device, and second data indicative of the transmit power of the beacon signal.

58. The computer program product of claim 57, wherein the beacon signal is transmitted over a beacon channel.

59. The computer program product of claim 57, further comprising code for causing a computer to receive data indicative of at least one of a time, duration, and periodic interval, for obtaining the power level of the signal and the transmit power of the beacon signal.

60. The computer program product of claim 57, further comprising code for causing a computer to obtain the first data indicative of the power level of the signal received from the wireless communication device, and the second data indicative of the transmit power of the beacon signal during at least one of a time, duration, and periodic interval.

61. The computer program product of claim 57, further comprising code for causing a computer to transmit third data indicative of at least one of a time, duration, and periodic interval in which the first data indicative of the power level of the signal received from the wireless communication device, and the second data indicative of the transmit power of the beacon signal were obtained.

62. The computer program product of claim 57, further comprising code for causing a computer to receive a message from the communication server and to establish a communication channel with the wireless communication device based at least in part on the message.

* * * * *